US012777550B2

(12) United States Patent
Tseng et al.

(10) Patent No.: US 12,777,550 B2
(45) Date of Patent: Oct. 27, 2026

(54) METHOD AND APPARATUS FOR MOBILITY ENHANCEMENT IN WIRELESS COMMUNICATION SYSTEMS

(71) Applicant: SHARP KABUSHIKI KAISHA, Sakai City (JP)

(72) Inventors: Yung-Lan Tseng, Taipei (TW); Yen-Hua Li, Taipei (TW); Hai-Han Wang, Taipei (TW); Hung-Chen Chen, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 403 days.

(21) Appl. No.: 18/368,180

(22) Filed: Sep. 14, 2023

(65) Prior Publication Data

US 2024/0098833 A1 Mar. 21, 2024

Related U.S. Application Data

(60) Provisional application No. 63/406,423, filed on Sep. 14, 2022.

(51) Int. Cl.
*H04W 76/27* (2018.01)
*H04W 72/23* (2023.01)
*H04B 7/185* (2006.01)

(52) U.S. Cl.
CPC ........... *H04W 76/27* (2018.02); *H04W 72/23* (2023.01); *H04B 7/18513* (2013.01)

(58) Field of Classification Search
None
See application file for complete search history.

(56) References Cited

U.S. PATENT DOCUMENTS

2021/0337602 A1 10/2021 Liu et al.
2022/0022276 A1* 1/2022 Shih ...................... H04L 5/0094
2022/0046498 A1 2/2022 Cheng et al.
2022/0078697 A1 3/2022 Tseng et al.
(Continued)

OTHER PUBLICATIONS

3GPP TS 38.321 V17.1.0 (Jun. 2022), 3rd Generation Partnership Project; Technical Specification Group Radio Access Network; NR; Medium Access Control (MAC) protocol specification (Release 17).
(Continued)

*Primary Examiner* — Clemence S Han
(74) *Attorney, Agent, or Firm* — ScienBiziP, P.C.

(57) ABSTRACT

A method for mobility enhancement in wireless communication systems is provided. The method is performed by a User Equipment (UE) configured with a first Small Data Transmission (SDT) configuration by a first cell. The method includes receiving a Radio Resource Control (RRC) release message including a suspend configuration from the first cell; transitioning to an RRC INACTIVE state in response to receiving the RRC release message; receiving, in the RRC INACTIVE state, a System Information Block Type 1 (SIB1) including a second SDT configuration from a second cell; camping on the second cell in response to receiving the SIB1 from the second cell; and while the UE is camping on the second cell, refraining from using the first SDT configuration to initiate an SDT procedure associated with the second cell in a case that the UE does not support performing the SDT procedure associated with the second cell.

20 Claims, 7 Drawing Sheets

(56) References Cited

U.S. PATENT DOCUMENTS

| | | | | |
|---|---|---|---|---|
| 2023/0015859 | A1* | 1/2023 | Tseng | H04W 72/569 |
| 2023/0088189 | A1* | 3/2023 | Tseng | H04W 52/0225 370/252 |
| 2024/0107628 | A1* | 3/2024 | Ma | H04W 76/30 |
| 2024/0163957 | A1* | 5/2024 | Zhang | H04W 76/19 |
| 2024/0244703 | A1* | 7/2024 | Tseng | H04B 17/328 |
| 2025/0168874 | A1* | 5/2025 | Wu | H04W 72/23 |
| 2025/0247890 | A1* | 7/2025 | Wu | H04W 74/006 |

OTHER PUBLICATIONS

3GPP TS 38.214 V17.2.0 (Jun. 2022), 3rd Generation Partnership Project; Technical Specification Group Radio Access Network; NR; Physical layer procedures for data (Release 17).

ZTE Corporation et al: "Control plane aspects of SDT", 3GPP Draft; R2-2009190, 3GPP TSG-RAN2#112e, Nov. 2-13, 2020 (Oct. 22, 2020).

* cited by examiner

METHOD AND APPARATUS FOR MOBILITY ENHANCEMENT IN WIRELESS COMMUNICATION SYSTEMS

CROSS-REFERENCE TO RELATED APPLICATION(S)

The present disclosure claims the benefit of and priority to U.S. Provisional Patent Application Ser. No. 63/406,423, filed on Sep. 14, 2022, entitled "MOBILITY ENHANCEMENTS FOR TN & NTN," the content of which is hereby incorporated herein fully by reference into the present disclosure for all purposes.

FIELD

The present disclosure is related to wireless communication and, more specifically, to a method and an apparatus for mobility enhancement in wireless communication systems.

BACKGROUND

Various efforts have been made to improve different aspects of wireless communication for cellular wireless communication systems, such as 5$^{th}$ Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and an apparatus for mobility enhancement in wireless communication systems.

In a first aspect of the present disclosure, a method performed by a User Equipment (UE) for mobility enhancement is provided. The UE is configured with a first Small Data Transmission (SDT) configuration by a first cell. The method includes receiving a Radio Resource Control (RRC) release message including a suspend configuration from the first cell; transitioning to an RRC INACTIVE state in response to receiving the RRC release message; receiving, in the RRC INACTIVE state, a System Information Block Type 1 (SIB1) including a second SDT configuration from a second cell; camping on the second cell in response to receiving the SIB1 from the second cell; and while the UE is camping on the second cell, refraining from using the first SDT configuration to initiate an SDT procedure associated with the second cell in a case that the UE does not support performing the SDT procedure associated with the second cell.

In some implementations of the first aspect of the present disclosure, the SDT procedure includes at least one of a Random Access (RA)-based SDT procedure, a Signaling Radio Bearer (SRB)-based SDT procedure, or a Configured Grant (CG)-based SDT procedure.

In some implementations of the first aspect of the present disclosure, the first cell includes a Terrestrial Network (TN) cell and the second cell includes a Non-Terrestrial Network (NTN) cell.

In some implementations of the first aspect of the present disclosure, refraining from using the first SDT configuration includes maintaining, but not using, the first SDT configuration while the UE is camping on the second cell.

In some implementations of the first aspect of the present disclosure, refraining from using the first SDT configuration includes releasing the first SDT configuration while the UE is camping on the second cell.

In some implementations of the first aspect of the present disclosure, the method further includes transitioning to an RRC IDLE state while the UE is camping on the second cell.

In some implementations of the first aspect of the present disclosure, the method further includes initiating an RRC resume procedure associated with the second cell for uplink packet transmissions or UE capability reporting after camping on the second cell.

In some implementations of the first aspect of the present disclosure, the method further includes switching to camp on a third cell after camping on the second cell; and initiating the SDT procedure associated with the third cell based on the first SDT configuration in a case that the UE supports performing the SDT procedure associated with the third cell, where the third cell is the first cell or a cell other than the first cell.

In some implementations of the first aspect of the present disclosure, the method further includes while the UE is camping on the second cell, initiating the SDT procedure associated with the second cell based on the first SDT configuration and the second SDT configuration in a case that the UE supports performing the SDT procedure associated with the second cell.

In some implementations of the first aspect of the present disclosure, the first cell and the second cell are identical and are either a Terrestrial Network (TN) cell or a Non-Terrestrial Network (NTN) cell.

In a second aspect of the present disclosure, a UE configured with a first Small Data Transmission (SDT) configuration by a first cell is provided. The UE includes at least one processor and at least one memory coupled to the at least one processor. The at least one memory stores one or more computer-executable instructions that, when executed by the at least one processor, cause the UE to receive a Radio Resource Control (RRC) release message including a suspend configuration from the first cell; transition to an RRC INACTIVE state in response to receiving the RRC release message; receive, in the RRC INACTIVE state, a System Information Block Type 1 (SIB1) including a second SDT configuration from a second cell; camp on the second cell in response to receiving the SIB1 from the second cell; and while the UE is camping on the second cell, refrain from using the first SDT configuration to initiate an SDT procedure associated with the second cell in a case that the UE does not support performing the SDT procedure associated with the second cell.

In some implementations of the second aspect of the present disclosure, the SDT procedure includes at least one of a Random Access (RA)-based SDT procedure, a Signaling Radio Bearer (SRB)-based SDT procedure, or a Configured Grant (CG)-based SDT procedure.

In some implementations of the second aspect of the present disclosure, the first cell includes a Terrestrial Network (TN) cell and the second cell includes a Non-Terrestrial Network (NTN) cell.

In some implementations of the second aspect of the present disclosure, refraining from using the first SDT configuration includes maintaining, but not using, the first SDT configuration while the UE is camping on the second cell.

In some implementations of the second aspect of the present disclosure, refraining from using the first SDT configuration includes releasing the first SDT configuration while the UE is camping on the second cell.

In some implementations of the second aspect of the present disclosure, the one or more computer-executable instructions, when executed by the at least one processor, further cause the UE to transition to an RRC IDLE state while the UE is camping on the second cell.

In some implementations of the second aspect of the present disclosure, the one or more computer-executable instructions, when executed by the at least one processor, further cause the UE to initiate an RRC resume procedure associated with the second cell for uplink packet transmissions or UE capability reporting after camping on the second cell.

In some implementations of the second aspect of the present disclosure, the one or more computer-executable instructions, when executed by the at least one processor, further cause the UE to switch to camp on a third cell after camping on the second cell; and initiate the SDT procedure associated with the third cell based on the first SDT configuration in a case that the UE supports performing the SDT procedure associated with the third cell, where the third cell is the first cell or a cell other than the first cell.

In some implementations of the second aspect of the present disclosure, the one or more computer-executable instructions, when executed by the at least one processor, further cause the UE to, while the UE is camping on the second cell, initiate the SDT procedure associated with the second cell based on the first SDT configuration and the second SDT configuration in a case that the UE supports performing the SDT procedure associated with the second cell.

In some implementations of the second aspect of the present disclosure, the first cell and the second cell are identical and are either a Terrestrial Network (TN) cell or a Non-Terrestrial Network (NTN) cell.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
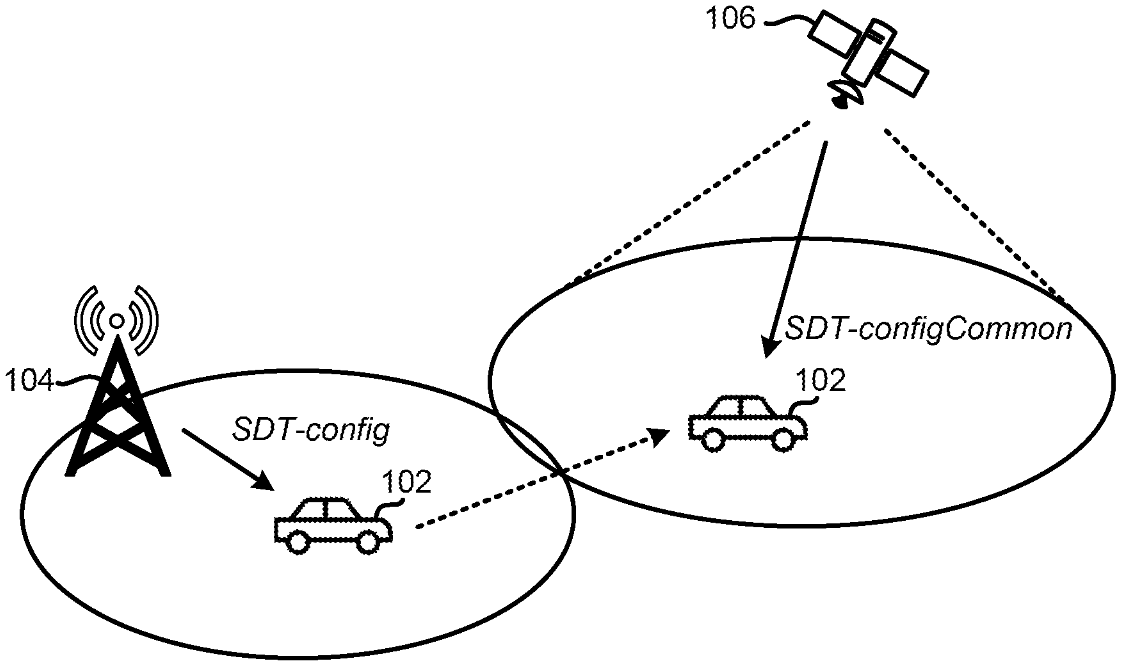
FIG. 1 is a diagram illustrating the transition of a User Equipment (UE) from a Terrestrial Network (TN) cell to a Non-Terrestrial Network (NTN) cell, according to an example implementation of the present disclosure.

Some of the abbreviations used in this disclosure include:

| Abbreviation | Full name |
|---|---|
| 3GPP | 3rd Generation Partnership Project |
| 5G | 5th Generation |
| 5GC | 5G Core |
| ARFCN | Absolute Radio-Frequency Channel Number |
| AS | Access Stratum |
| ASN.1 | Abstract Syntax Notation One |
| BS | Base Station |
| BWP | Bandwidth Part |
| CA | Carrier Aggregation |
| CAG | Closed Access Group |
| CG | Configured Grant |
| CN | Core Network |
| CU | Central Unit |
| DAPS | Dual Active Protocol Stack |
| DC | Dual Connectivity |
| DCI | Downlink Control Information |
| DL | Downlink |
| DRB | Data Radio Bearer |
| DU | Distributed Unit |
| E-UTRA(N) | Evolved Universal Terrestrial Radio Access (Network) |
| EN-DC | E-UTRA NR Dual Connectivity |
| EPC | Evolved Packet Core |
| eMTC | enhanced Machine Type Communication |
| GEO | Geostationary Equatorial Orbit |
| GNSS | Global Navigation Satellite System |
| GW | Gateway |
| HARQ | Hybrid Automatic Repeat Request |
| FR | Frequency Range |
| IAB | Integrated Access and Backhaul |
| ID | Identifier |
| IE | Information Element |
| IoT | Internet of Things |
| ITS | Intelligent Transportation System |
| LAN | Local Area Network |
| LEO | Low Earth Orbit |
| LTE | Long Term Evolution |
| MAC | Medium Access Control |
| MAC CE | MAC Control Element |
| MCG | Master Cell Group |
| MIB | Master Information Block |
| MN | Master Node |
| MSG | Message |
| MSG1 | Message 1 |
| MSG2 | Message 2 |
| MSG3 | Message 3 |
| MSG4 | Message 4 |
| MSGA | Message A |
| MSGB | Message B |
| MT | Mobile Termination |
| NAS | Non-Access Stratum |
| NB-IoT | Narrow Band Internet of Things |
| NE-DC | NR—E-UTRA Dual Connectivity |
| NPN | Non-Public Network |
| NR | New Radio |
| NR-U | NR Unlicensed |
| NTN | Non-Terrestrial Network |
| NW | Network |
| PCell | Primary Cell |
| PCI | Physical Cell Identity |

-continued

| Abbreviation | Full name |
|---|---|
| PDCCH | Physical Downlink Control Channel |
| PDSCH | Physical Downlink Shared Channel |
| PDU | Protocol Data Unit |
| PHY | Physical (layer) |
| PLMN | Public Land Mobile Network |
| PNI-NPN | Public Network Integrated Non-Public Network |
| PRACH | Physical Random Access Channel |
| PSCell | Primary SCG Cell/Primary Secondary Cell |
| PUCCH | Physical Uplink Control Channel |
| PUSCH | Physical Uplink Shared Channel |
| RA | Random Access |
| RAN | Radio Access Network |
| RAR | Random Access Response |
| RAT | Radio Access Technology |
| RF | Radio Frequency |
| RNTI | Radio Network Temporary Identifier |
| RRC | Radio Resource Control |
| RS | Reference Signal |
| RSRP | Reference Signal Received Power |
| SCell | Secondary Cell |
| SCG | Secondary Cell Group |
| SDT | Small Data Transmission |
| SI | System Information |
| SIB | System Information Block |
| SL | Sidelink |
| SN | Secondary Node |
| SNPN | Stand-alone Non-Public Network |
| SRB | Signaling Radio Bearer |
| SSB | Synchronization Signal Block |
| SUL | Supplementary Uplink |
| TN | Terrestrial Network |
| TS | Technical Specification |
| UE | User Equipment |
| UL | Uplink |
| UL-CG | Uplink-Configured Grant |
| USIM | Universal Subscriber Identity Module |
| V2X | Vehicle-to-Everything |
| VSAT | Very Small Aperture Terminal |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As previously disclosed, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following paragraphs, (sub)-bullets, points, actions, behaviors, terms, or claims described in the present disclosure may be combined logically, reasonably, and properly to form a specific method.

Any sentence, paragraph, (sub)-bullet, point, action, behaviors, terms, or claims described in the present disclosure may be implemented independently and separately to form a specific method.

Dependency, e.g., "based on", "more specifically", "preferably", "in one embodiment", "in some implementations", etc., in the present disclosure is just one possible example which would not restrict the specific method.

"A and/or B" in the present disclosure may refer to either A or B, both A and B, at least one of A and B.

The introduction of NTNs into the 3GPP 5G NR/E-UTRA system aims to enhance 5G communications. However, this introduction brings forth various technical challenges that require attention for seamless integration with existing 5G systems, including TNs. This disclosure outlines analysis, and proposed solutions, for:

1) Challenges raised based on the co-existence between an NTN and a TN.

2) UE mobility enhancements, specifically during the transitions between the TNs and the NTNs for particular services or functionalities, such as an SDT.

It should be noted that the scope of this disclosure is, however, not limited to the NTN-TN integration, or to the UE mobility enhancements.

SDT Procedures Associated with an NTN

In some implementations, a UE may have different UE capabilities for the TN and the NTN. For example, depending on the UE capability, the UE may support initiating/performing an SDT procedure associated with a TN cell selected by the UE, but may not support initiating/performing the SDT procedure associated with an NTN cell selected by the UE. In another example, the UE may support initiating/performing the SDT procedure associated with the NTN cell, but not for the TN cell. In some implementations, the UE may further report the different UE capabilities to the serving RAN (e.g., via UE Assistance Information transmission in the uplink transmission while the serving RAN of the UE changes from a TN to an NTN or vice versa). In some implementations, the UE may have the same UE capabilities towards TN/NTN but the UE's capability (to one specific function, such as whether the UE supports RRC Inactive state or Small Data Transmission) may change with time. Under such a condition, the UE may also report the latest UE capabilities to the serving RAN (e.g., to a serving TN cell or NTN cell). In some implementations, the UE may need to report the functionality which the UE does not support to the serving RAN.

The IE NTN-Parameters may be used to convey a subset of the UE Radio Access Capability Parameters that are applicable to the NTN access when the parameters differ from those that are applicable to the TN access. Table 1 below presents an example of the data structure of the IE NTN-Parameters, which is represented using ASN.1.

TABLE 1

```
-- ASN1START
-- TAG-NTN-PARAMETERS-START
NTN-Parameters-r17 ::= SEQUENCE {
  inactiveStateNTN-r17              ENUMERATED {supported}
OPTIONAL,
  ra-SDT-NTN-r17                    ENUMERATED {supported}
OPTIONAL,
  srb-SDT-NTN-r17                   ENUMERATED {supported}
OPTIONAL,
  measAndMobParametersNTN-r17       MeasAndMobParameters
OPTIONAL,
  mac-ParametersNTN-r17      MAC-Parameters                    OPTIONAL,
  phy-ParametersNTN-r17      Phy-Parameters                    OPTIONAL,
  fdd-Add-UE-NR-CapabilitiesNTN-r17 UE-NR-CapabilityAddXDD-Mode
OPTIONAL,
  fr1-Add-UE-NR-CapabilitiesNTN-r17 UE-NR-CapabilityAddFRX-Mode
OPTIONAL,
  ue-BasedPerfMeas-ParametersNTN-r17 UE-BasedPerfMeas-Parameters-r16
OPTIONAL,
  son-ParametersNTN-r17             SON-Parameters-r16          OPTIONAL
}
-- TAG-NTN-PARAMETERS-STOP
-- ASN1STOP
```

The descriptions for the fields presented in the IE NTN-Parameters are provided in Table 2 below.

TABLE 2

| fdd-Add-UE-NR-CapabilitiesNTN: |
|---|
| NTN related capabilities which the UE supports in the NTN differently than in the TN. If absent, fdd-Add-UE-NR-Capabilities applies to the NTN. |
| fr1-Add-UE-NR-CapabilitiesNTN: |
| NTN related capabilities which the UE supports in the NTN differently than in the TN. If absent, fr1-Add-UE-NR-Capabilities applies to the NTN. |
| inactiveStateNTN: |
| The field indicates whether the RRC INACTIVE state is supported in the NTN. If absent, inactiveState doesn't apply to the NTN. |
| mac-ParametersNTN: |
| NTN related capabilities which the UE supports in the NTN differently than in the TN. If absent, mac-Parameters applies to the NTN. |
| measAndMobParametersNTN: |
| NTN related capabilities which the UE supports in the NTN differently than in the TN. If absent, measAndMobParameters applies to the NTN. |
| phy-ParametersNTN: |
| NTN related capabilities which the UE supports in the NTN differently than in the TN. If absent, phy-Parameters applies to the NTN. |
| ra-SDT-NTN: |
| The field indicates whether the RA-SDT is supported in the NTN. If absent, ra-SDT-r17 doesn't apply to NTN. |
| son-ParametersNTN: |
| NTN related capabilities which the UE supports in NTN differently than in TN. If absent, son-Parameters-r16 applies to NTN. |
| srb-SDT-NTN: |
| The field indicates whether the SRB-SDT is supported in NTN. If absent, srb-SDT-r17 doesn't apply to NTN. |
| ue-BasedPerfMeas-ParametersNTN: |
| NTN related capabilities which the UE supports in NTN differently than in TN. If absent, ue-BasedPerfMeas-Parameters-r16 applies to NTN. |

It should be noted that in the present disclosure, certain parameters/fields are appended with suffixes like "-r17" or "-r16" to indicate their correspondence with specific 3GPP technical specification versions (e.g., mac-ParametersNTN-r17, fdd-Add-UE-NR-CapabilitiesNTN-r17, ue-BasedPerfMeas-Parameters-r16, etc.). References to the parameters/fields without such suffixes are to be understood as equally applicable to the corresponding parameters/fields that include the suffixes. For example, the mac-ParametersNTN in Table 2 can also refer to the mac-ParametersNTN-r17 in Table 1, the fdd-Add-UE-NR-CapabilitiesNTN in Table 2 can also refer to the fdd-Add-UE-NR-CapabilitiesNTN-r17 in Table 1, and so on.

In some implementations, a UE may receive an SDT configuration (e.g., SDT-config) from its serving cell (e.g., a TN cell) via DL control signaling, such as through an RRC Release message. The SDT configuration may enable the UE to implement an SDT procedure. However, challenges may arise when the UE transitions from a TN cell to an NTN cell. Specifically, the UE might retain the original SDT configuration (e.g., by storing the SDT configuration at the UE side) but may be incapable of initiating an SDT procedure that is compatible with the new serving NTN cell. In the present disclosure, an SDT procedure may include at least one of the following: a CG-based SDT (CG-SDT) procedure, an RA-based SDT (RA-SDT) procedure, and an SRB-based SDT (SRB-SDT) procedure.

FIG. 1 is a diagram illustrating the transition of a UE from a TN cell to an NTN cell, according to an example implementation of the present disclosure. As illustrated in FIG. 1, UE 102 may first receive a (UE-specific) SDT configuration (e.g., SDT-config) from its serving TN cell 104 through UE-specific control signaling (e.g., an RRC Release message, which also refers to an "RRCRelease message" in the present disclosure). Subsequently, UE 102 may transition from the coverage area of TN cell 104 to that of NTN cell 106, resulting in NTN cell 106 becoming the current serving cell of UE 102. NTN cell 106 may support the execution of an SDT procedure by configuring its served UE(s) (e.g., UE 102) with an RA-SDT configuration (e.g., SDT-ConfigCommon) and configuring the physical resources for initiating the SDT procedure. For example, NTN cell 106 may broadcast the SDT configuration (e.g., SDT-ConfigCommon) in the system information, such as SIB1. In addition, according to 3GPP specifications, the UE's upper layers may be capable of initiating an SDT procedure (e.g., an RA-SDT procedure by jointly based on the random access resource included in the SDT-ConfigCommon and/or the SDT-config stored by the UE) with the serving NTN cell. An example of the conditions for initiating an SDT procedure is shown in Table 3 below.

TABLE 3

| Conditions for initiating SDT |
| --- |
| A UE in RRC INACTIVE initiates the resume procedure for SDT when all of the following conditions are fulfilled:<br>1> the upper layers request resumption of RRC connection; and<br>1> SIB1 includes sdt-ConfigCommon; and<br>1> sdt-Config is configured; and<br>1> all the pending data in UL is mapped to the radio bearers configured for SDT; and<br>1> lower layers indicate that conditions for initiating SDT as specified in TS 38.321 [3] are fulfilled. |

NOTE:
How the UE determines that all pending data in UL is mapped to radio bearers configured for SDT is left to UE implementation.

UE's Capability to Initiate/Perform an SDT Procedure Associated with the Serving NTN Cell In certain situations, the UE (e.g., UE 102) may be incapable of initiating an SDT procedure associated with an NTN cell (e.g., NTN cell 106). To address this issue, certain mechanisms are proposed below.

In some implementations, the UE may assess its own capabilities when the UE is triggered (e.g., by the NAS layer or by the RRC layer) to implement an SDT procedure. As illustrated in FIG. 1, the UE may camp on an NTN cell. Additionally, the NTN cell may support an SDT procedure (e.g., an RA-SDT procedure, a CG-SDT procedure, and/or an SRB-SDT procedure) by broadcasting the SDT-ConfigCommon in the system information. For example, the SDT-ConfigCommon may be broadcast by a TN cell or an NTN cell using a SIB1 delivery approach (e.g., via a broadcasting approach or via a UE-specific dedicated control signaling approach).

An example of the data structure of the SIB1 is provided in Table 4 below.

TABLE 4

```
SIB1-v1700-IEs ::=      SEQUENCE {
  hsdn-Cell-r17          ENUMERATED {true}                              OPTIONAL,
-- Need R
  uac-BarringInfo-v1700        SEQUENCE {
    uac-BarringInfoSetList-v1700      UAC-BarringInfoSetList-v1700
  }                                                    OPTIONAL, -- Cond MINT
  sdt-ConfigCommon-r17                                 SDT-ConfigCommonSIB-r17
OPTIONAL,   -- Need R
  redCap-ConfigCommon-r17                              RedCap-ConfigCommonSIB-r17
OPTIONAL,   -- Need R
  featurePriorities-r17     SEQUENCE {
    redCapPriority-r17        FeaturePriority-r17                       OPTIONAL, -
- Need R
    slicingPriority-r17        FeaturePriority-r17                      OPTIONAL, --
Need R
    msg3-Repetitions-Priority-r17 FeaturePriority-r17                     OPTIONAL,
-- Need R
    sdt-Priority-r17         FeaturePriority-r17                        OPTIONAL --
Need R
  }                                                       OPTIONAL, -- Need R
  si-SchedulingInfo-v1700      SI-SchedulingInfo-v1700                   OPTIONAL,
-- Need R
  hyperSFN-r17          BIT STRING (SIZE (10))                           OPTIONAL,
-- Need R
  eDRX-AllowedIdle-r17       ENUMERATED {true}                           OPTIONAL,
-- Need R
  eDRX-AllowedInactive-r17       ENUMERATED {true}                        OPTIONAL,
-- Cond EDRX-RC
  intraFreqReselectionRedCap-r17       ENUMERATED            {allowed,   notAllowed}
OPTIONAL,   -- Need S
  cellBarredNTN-r17                            ENUMERATED {barred, notBarred}
OPTIONAL,   -- Need S
  nonCriticalExtension        SEQUENCE { }                                OPTIONAL
}
```

An example of the data structure of the SDT-ConfigCommonSIB (e.g., which is denoted as SDT-ConfigCommonSIB-r17 in Table 5) is provided in Table 5 below. It should be noted that the term "SDT-ConfigCommonSIB" and the term "SDT-ConfigCommon" may be used interchangeably in the present disclosure.

TABLE 5

```
SDT-ConfigCommonSIB-r17 ::=        SEQUENCE {
  sdt-RSRP-Threshold-r17      RSRP-Range                                    OPTIONAL,
-- Need R
  sdt-LogicalChannelSR-DelayTimer-r17 ENUMERATED { sf20, sf40, sf64, sf128, sf512,
sf1024, sf2560, spare1} OPTIONAL, -- Need R
  sdt-DataVolumeThreshold-r17         ENUMERATED {byte32, byte100, byte200, byte400,
byte600, byte800, byte1000, byte2000, byte4000,byte8000, byte9000, byte10000, byte12000,
byte24000, byte48000, byte96000},
  t319a-r17                  ENUMERATED { ms100, ms200, ms300, ms400, ms600, ms1000,
ms2000, ms3000, ms4000, spare7, spare6, spare5, spare4, spare3, spare2, spare1}
}
```

From the perspective of the UE, however, support for an SDT procedure associated with an NTN cell may or may not be present. In some implementations, the UE may choose to initiate an SDT procedure associated with an NTN cell (only) in a case that the UE supports the SDT procedure associated with the NTN cell. Conversely, in a case that the UE does not support an SDT procedure (e.g., with the NTN cell), the UE may choose not to initiate the SDT procedure associated with the NTN cell. Otherwise, the UE may be triggered to initiate a procedure which the UE fails to support. In some implementations, this mechanism may be implemented as a kind of UE capability check when/after the UE receives a service request from the upper layer of the UE side (e.g., an UL packet transmission request from the upper layer while the UE is staying in RRC Inactive state). In some implementations, the UE capability to one specific function may change with time or with different frequency carriers and so the UE may need to implement UE capability check (towards one specific service/function) while the UE receives the service request from the upper layers of the UE.

It should be noted that in the present disclosure, an SDT procedure may refer to an RA-SDT procedure, a CG-SDT procedure, an SRB-SDT procedure, or a combination of thereof (e.g., including at least one of the RA-SDT procedure, the CG-SDT procedure and the SRB-SDT procedure). Additionally, when a UE is said to support an (RA-/CG-/SRB-) SDT (procedure), this may mean that the UE is capable of initiating and/or performing the (RA-/CG-/SRB-) SDT (procedure). For example, if a UE supports an SDT procedure with (or 'associated with') an NTN cell, this could mean that the UE is capable of initiating the SDT procedure associated with the NTN cell and/or performing the SDT procedure in conjunction with the NTN cell. On the other hand, when a UE is said not to support an SDT procedure (e.g., a CG-SDT/RA-SDT/SRB-SDT procedure), this may mean that the UE is incapable of initiating and/or performing the SDT procedure. For example, if a UE supports an SDT procedure associated with an NTN cell, this could mean that the UE is incapable of initiating the SDT procedure associated with the NTN cell and/or performing the SDT procedure in conjunction with the NTN cell.

In some implementations, the UE may choose to initiate an RA-SDT procedure associated with an NTN cell (only) if the UE supports the RA-SDT procedure. Conversely, the UE may choose not to initiate an RA-SDT procedure associated with an NTN cell if the UE does not support the RA-SDT procedure. In some implementations, the UE may choose to initiate an SRB-SDT procedure associated with an NTN cell (only) if the UE supports the SRB-SDT procedure. Conversely, the UE may choose not to initiate an SRB-SDT procedure associated with an NTN cell if the UE does not support the SRB-SDT procedure.

In some implementations, the UE may choose to initiate a CG-SDT procedure associated with an NTN cell (only) if the UE supports the CG-SDT procedure. Conversely, the UE may choose not to initiate a CG-SDT procedure associated with an NTN cell if the UE does not support the CG-SDT procedure. In some implementations, the UE may report its capability for CG-SDT (e.g., whether the UE supports a CG-SDT procedure) in NTN-parameters. In some implementations, the NTN-parameters may also be used to report the UE capability of whether the UE supports the RA-SDT procedure.

In some implementations, the UE (e.g., the RRC entity of the UE) may notify the upper layers (e.g., the NAS layer responsible for instructing or initiating the SDT procedure) that the prerequisites for executing an SDT procedure are not met. This may occur due to the UE not supporting the SDT procedure associated with the serving RAN (e.g., a serving NTN cell), thereby preventing the triggering of the SDT procedure. In some implementations, the lower layers (e.g., the RRC layer or the MAC layer) may communicate a failure cause (e.g., the UE does not support RA-SDT with the serving network) to the upper layers of the UE (e.g., the NAS layer).

In some implementations, the UE may release its stored SDT configuration (e.g., the SDT-config received from the serving TN or NTN cell of the UE) if the UE (re)selects to camp on an NTN cell and does not support the SDT/RA-SDT/CG-SDT/SRB-SDT procedures associated with the camped NTN cell.

In some implementations, the UE may release its stored SDT configuration (e.g., the SDT-config received from the serving TN or NTN cell of the UE) after being triggered by the upper layers to initiate an SDT/RA-SDT/CG-SDT/SRB-SDT procedure associated with an NTN cell on which the UE is camping, provided the UE does not support the SDT/RA-SDT/CG-SDT/SRB-SDT procedures associated with the camped NTN cell.

In some implementations, the UE may keep (or retain) the stored SDT configuration (e.g., the SDT-config) that, for example, the UE has received from its serving RAN (e.g., at least one of NTN cells, TN cells, TN BSs, NTN BSs, NTN gateways, and NTN payloads) after/at the time the UE (re)selects an NTN cell, provided that the UE supports the SDT/CG-SDT/RA-SDT/SRB-SDT procedures associated with the NTN cell (e.g., the UE's capability regarding the SDT/CG-SDT/RA-SDT/SRB-SDT procedures in the NTN-parameters is marked as "supported").

In some implementations, the UE may not receive/store (or release) the common/cell specific SDT configuration transmitted by the serving cell (e.g., SDT-ConfigCommon, which may be transmitted by the serving RAN via broadcasting system information and/or UE-specific DL Radio Resource Control signaling) if the UE does not support the SDT/CG-SDT/RA-SDT/SRB-SDT service with the serving RAN. In some implementations, the UE may receive/store/retain the common/cell specific SDT configuration transmitted by the serving cell (e.g., SDT-ConfigCommon, which may be transmitted by the serving RAN via broadcasting system information and/or UE-specific DL Radio Resource Control signaling) if the UE does not support the SDT/CG-SDT/RA-SDT/SRB-SDT service with the serving RAN.

In some implementations, the UE may continue to keep (or retain) the stored SDT configuration (e.g., the SDT-config received from the serving RAN of the UE) even after (or at the same time that) the UE (re)selects an NTN cell to camp on, regardless of whether the UE supports the SDT/CG-SDT/RA-SDT/SRB-SDT procedures associated with the NTN cell (e.g., the UE's capability regarding the SDT/CG-SDT/RA-SDT/SRB-SDT procedures in the NTN-parameters is absent).

In some implementations, the UE may continue to keep (or retain) the stored SDT configuration (e.g., the SDT-config received from the serving TN cell or NTN cell of the UE) after the UE is triggered by the upper layers to initiate an SDT/RA-SDT/CG-SDT/SRB-SDT procedure in association with the current NTN cell, even if the UE does not support the SDT/RA-SDT/CG-SDT/SRB-SDT procedures associated with the NTN cell.

In some implementations, the UE may release the stored SDT configuration (e.g., the SDT-config received from the serving RAN of the UE) if the UE is configured to prioritize the NTN cells over the TN cells (e.g., by giving the NTN cells a higher priority value than the TN cells) during a cell (re)selection procedure and does not support the SDT/RA-SDT/CG-SDT/SRB-SDT procedures associated with the NTN cells.

In some implementations, the UE may retain the stored SDT configuration (e.g., the SDT-config received from its serving RAN) even if the UE is configured to prioritize the NTN cells over the TN cells during the cell (re)selection procedure and does not support the SDT/RA-SDT/CG-SDT/SRB-SDT procedures associated with the NTN cells.

In some implementations, if the UE does not support the SDT/RA-SDT/CG-SDT/SRB-SDT procedures associated with an NTN cell (e.g., the UE's capability regarding the SDT/RA-SDT/CG-SDT/SRB-SDT procedures is marked as "not supported" or is absent in the NTN-parameters), the UE may remain in the RRC INACTIVE state after/at the time the UE (re)selects to camp on the NTN cell. In this scenario, the UE may choose to retain or release the stored SDT configuration that was previously received from the serving RAN (e.g., via a previous serving (TN/NTN) cell). In some implementations, the UE may reapply (or reuse) the stored SDT configuration to initiate/perform an SDT procedure the next time the UE transitions from the NTN cell to a TN cell that supports the SDT/RA-SDT/CG-SDT procedures.

In some implementations, If the UE chooses to keep/retain the stored SDT configuration, the UE may choose to release its stored SDT configuration (only) upon receiving instructions from the upper layers to initiate an SDT/CG-SDT/RA-SDT/SRB-SDT procedure that the UE may not support with the current serving NTN cell. In some implementations, if the UE chooses to keep/retain the stored SDT configuration, the UE may also choose not to release the SDT configuration, even after receiving instructions from the upper layers to initiate an SDT/RA-SDT/CG-SDT/SRB-SDT procedure that the UE does not support.

In some implementations, if the UE (re)selects to camp on an NTN cell while it lacks support for the SDT/RA-SDT/CG-SDT/SRB-SDT procedures associated with the NTN cell (e.g., the UE's capability regarding the SDT/RA-SDT/CG-SDT/SRB-SDT procedures in the NTN-parameters is marked as "not supported" or is absent), the UE may transition to the (NR/E-UTRA) RRC IDLE state. Moreover, if the UE (re)selects to camp on an NTN cell and does not support the SDT/CG-SDT/RA-SDT/SRB-SDT procedures associated with the NTN cell (e.g., the UE's capability regarding the SDT/RA-SDT/CG-SDT/SRB-SDT procedures in the NTN-parameters is marked as "not supported" or is absent), the UE may release the stored SDT configuration that the UE has received from the serving RAN (e.g., NR RAN and/or E-UTRA) of the UE.

In some implementations, the UE may use a UE capability enquiry procedure or a UE Assistance Information (or "UEAssistanceInformation") delivery procedure to inform the serving RAN (e.g., which may be a combination of one or more TN cells and one or more NTN cells) whether the UE supports the SDT/CG-SDT/RA-SDT/SRB-SDT procedures associated with the NTN cells.

Figure 2A:
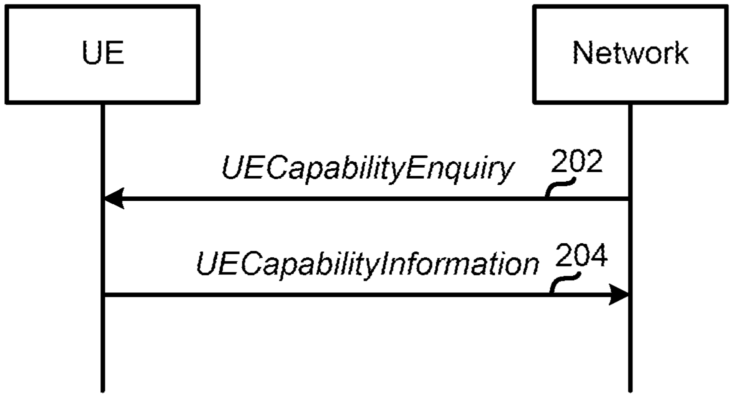
FIG. 2A is a diagram illustrating a UE capability enquiry procedure, according to an example implementation of the present disclosure.

FIG. 2A is a diagram illustrating a UE capability enquiry procedure, according to an example implementation of the present disclosure. As illustrated in FIG. 2A, in action 202, the UE may receive a UE capability enquiry (or "UECapabilityEnquiry") message from the network (e.g., the serving RAN of the UE). In action 204, the UE may transmit the UE capability information (or "UECapabilityInformation") to the network in response to receiving the UECapabilityEnquiry message. In some implementations, the UE may transmit the assistance information without receiving an explicit inquiry, as shown in FIG. 2A, from the network. For example, as shown in FIG. 2B, the UE may transmit the assistance information to the network after receiving a reconfiguration message.

Figure 2B:
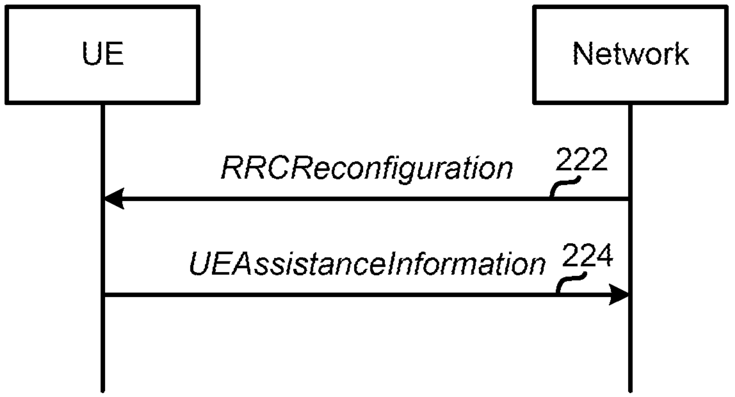
FIG. 2B is a diagram illustrating a UE Assistance Information delivery procedure, according to an example implementation of the present disclosure.

FIG. 2B is a diagram illustrating a UE Assistance Information delivery procedure, according to an example implementation of the present disclosure. As illustrated in FIG. 2B, in action 222, the UE may receive an RRC reconfiguration (or "RRCreconfiguration") message from the network (e.g., the serving RAN of the UE). In action 224, the UE may transmit UE assistance information (or "UEAssistanceInformation") to the network in response to receiving the RRCreconfiguration message.

In the present disclosure, the term "network" may refer to a network that includes at least one TN cell and/or at least one NTN cell, or may refer to a network that includes at least one of an eNB, a gNB, an NTN gateway, and an NTN payload.

In some implementations, the UE may either support or not support the CG-SDT/RA-SDT procedures associated with the NTN cells. In some implementations, the UE may automatically switch to support the CG-SDT/RA-SDT procedures associated with the NTN cells if the UE has already delivered its capabilities regarding the SDT procedures to the network.

In some implementations, the UE's capability may temporarily change due to various factors such as a manual operation, overheating, serving frequency change, or hardware co-existence issues. The UE may change its capability/support for the SDT/CG-SDT/RA-SDT/SRB-SDT procedures associated with the serving NTN cell or the serving TN cell to "supported" or "not supported."

Under such a condition, the UE may present at least one of the following behaviors (1) and (2):

(1) The UE may report or update its latest capabilities (e.g., whether the SDT/RA-SDT/CG-SDT/SRB-SDT procedures associated with the TN/NTN access is supported) to the serving (TN/NTN) cell of the UE (e.g., while the UE is in an RRC CONNECTED state).

(2) The UE may not need to report its latest capabilities to the serving cell of the UE, but the UE may release or retain the stored SDT configuration (e.g., while the UE is in an RRC IDLE or an RRC INACTIVE state) if the UE's capabilities have changed. In some implementations, the UE may be triggered to initiate an RRC Resume procedure to report the changes in its support for the SDT/RA-SDT/CG-SDT/SRB-SDT procedures (e.g., to report one or more UE capability change conditions regarding the changes in the UE's support for the SDT/RA-SDT/CG-SDT/SRB-SDT procedures).

In some implementations, the UE may not release (e.g., may refrain from releasing) the stored SDT-Config if/at the time/after its capability status changes from "SDT/RA-SDT/CG-SDT/SRB-SDT supported" to "SDT/RA-SDT/CG-SDT/SRB-SDT not supported." In some implementations, the UE may release the stored SDT-Config if/at the time/after its capability status changes from "SDT/RA-SDT/CG-SDT/SRB-SDT supported" to "SDT/RA-SDT/CG-SDT/SRB-SDT not supported."

In some implementations, the UE may transition from the RRC INACTIVE state to the RRC IDLE state if/at the time/after the UE changes its capability status from "SDT/RA-SDT/CG-SDT/SRB-SDT supported" to "SDT/RA-SDT/CG-SDT/SRB-SDT not supported." In some implementations, the UE may stay/remain in the RRC INACTIVE state if/after/at the time the UE changes its capability status from "SDT/RA-SDT/CG-SDT/SRB-SDT supported" to "SDT/RA-SDT/CG-SDT/SRB-SDT not supported."

In some implementations, if the UE does not support the SDT/CG-SDT/RA-SDT/SRB-SDT procedures associated with the NTN cells, the NTN cell may not configure or transmit the SDT/CG-SDT/RA-SDT/SRB-SDT configuration information to the UE via an RRC Release message.

In some implementations, the UE may not expect to receive an SDT-config (e.g., which may include configurations/parameters for the CG-SDT procedure, the RA-SDT procedure, or the SRB-SDT procedure) from a serving NTN cell (e.g., during the RRC (Connection) Release message reception) if the UE does not support the SDT/CG-SDT/RA-SDT/SRB-SDT procedure associated with the NTN cells. In some implementations, if the UE does not support the SDT/CG-SDT/RA-SDT/SRB-SDT procedures associated with the NTN cells, the UE may not expect to receive the SDT-config, which may include configurations/parameters for the SDT/CG-SDT/RA-SDT/SRB-SDT procedures, in an RRC (Connection) Release message from a serving NTN cell.

In some implementations, an NTN cell may still transmit an SDT configuration (e.g., a configuration for at least one of a CG-SDT procedure, an RA-SDT procedure, and an SRB-SDT procedure) to the UE via the UE-specific DL control signaling (e.g., through an RRC Release message), regardless of whether the UE supports the SDT/CG-SDT/RA-SDT/SRB-SDT procedures associated with the NTN cells. Under such a circumstance, the UE may apply the received SDT configuration to initiate/perform an SDT procedure once the UE becomes capable of supporting the SDT/CG-SDT/RA-SDT/SRB-SDT procedures. In some implementations, the SDT configuration provided by the NTN cell may be associated with a TN cell. In such cases, the UE may store the SDT configuration associated with the TN cell. In some such implementations, the next time the UE moves to or selects a TN cell that supports the SDT/CG-SDT/RA-SDT/SRB-SDT procedures to camp on, the UE may initiate the corresponding SDT procedure based on the stored SDT configuration (e.g., which is provided by the previous serving (NTN) cell on which the UE was camping) and/or the SDT-ConfigCommon transmitted by the selected TN cell (e.g., via broadcasting system information, such as SIB1). Additionally, in some implementations, the UE may (re)select a TN cell to camp on based on the instructions received from the current serving NTN cell of the UE (e.g., via redirected carrier information (or "re-directedcarrierinformation"), UE-specific control signaling, or broadcast system information from the current serving NTN cell).

In some implementations, the received SDT/CG-SDT/RA-SDT/SRB-SDT configuration may be associated with a validity period. In some such implementations, the UE may store or keep the SDT/CG-SDT/RA-SDT/SRB-SDT configuration (only) for the duration of the validity period. In some implementations, the UE may release/drop/remove/erase the stored SDT/CG-SDT/RA-SDT/SRB-SDT configuration(s) after the validity period (or while the validity period expires).

In some implementations, the NTN cell may transmit a CG-SDT configuration to the UE, allowing the UE to initiate a CG-SDT procedure associated with the same serving (NTN) cell while the UE is in the RRC INACTIVE state. This may be applicable if, for example, the UE does not support the RA-SDT procedures associated with the NTN cells but does support the CG-SDT procedures. In some implementations, the NTN cell may transmit a RA-SDT configuration to the UE, allowing the UE to initiate a RA-SDT procedure associated with the same serving (NTN) cell while the UE is in the RRC INACTIVE state. This would be applicable if, for example, the UE does not support the CG-SDT procedures associated with the NTN cells but does support the RA-SDT procedures.

In some implementations, the UE may be configured (e.g., through pre-configuration, pre-installation in a USIM, broadcast system information, or UE-specific DL control signaling) with high priority (e.g., a high priority value or other NTN prioritization rules) to the NTN cells or NTN access during a cell (re)selection procedure. The UE may also be configured with an SDT-config for an SDT procedure. Under such a condition, the UE may present at least one of the following behaviors (1) to (3):

(1) The UE may temporarily ignore the received NTN prioritization rules and attempt to (re)select a TN cell to initiate the SDT procedure.

(2) The UE may follow or obey the received NTN prioritization rules and attempt to (re)select an NTN cell for an initiated SDT procedure or for initiating an SDT procedure (only) if the UE supports the SDT/RA-SDT/CG-SDT/SRB-SDT procedures associated with the NTN cells.

(3) The UE may follow or obey the received NTN prioritization rules (e.g., location-based, time-based, and/or DL-RSRP threshold-based priority rules) and attempt to (re)select an NTN cell to camp on, even if the UE has a stored SDT-config and does not support S the DT/RA-SDT/CG-SDT/SRB-SDT procedures associated with the NTN cells or NTN access.

In some implementations, a cell/eNB/gNB/BS (e.g., a TN cell or TN BS) may not transmit the SDT-related configurations associated with a specific UE (e.g., the SDT-config as per 3GPP spec) to an NTN cell or an NTN BS if the UE is not capable of implementing an SDT procedure (e.g., including at least one of a CG-SDT procedure, an RA-SDT procedure, and an SRB-SDT procedure) on the NTN cell or the NTN BS.

In some implementations, the cell/eNB/gNB/BS (e.g., a TN cell or TN BS) may transmit the SDT-related configurations associated with a specific UE (e.g., the SDT-config as per 3GPP spec) to an NTN cell or an NTN BS, even if the UE may not be capable of implementing an SDT procedure (e.g., including at least one of a CG-SDT procedure, an RA-SDT procedure, and an SRB-SDT procedure) on the NTN cell or the NTN BS.

Table 6 below shows an example of conditions for initiating an SDT procedure. As illustrated in Table 6, the UE's capability to support the SDT procedures is taken into account when the UE is requested to resume an RRC connection for initiating the SDT procedure.

TABLE 6

| Conditions for initiating SDT |
| --- |
| A UE in RRC INACTIVE initiates the resume procedure for SDT when all of the following conditions are fulfilled:<br>1> the upper layers request resumption of RRC connection; and<br>1> SIB1 includes sdt-ConfigCommon; and<br>1> if the UE is camped with an NTN cell; and<br>2> if the UE supports SDT (e.g., RA-SDT/CG-SDT/SRB-SDT) with the serving NTN cell; and<br>1> sdt-Config is configured; and<br>1> all the pending data in UL is mapped to the radio bearers configured for SDT; and<br>1> lower layers indicate that conditions for initiating SDT as specified in TS 38.321 [3] are fulfilled. |

NOTE:
How the UE determines that all pending data in UL is mapped to radio bearers configured for SDT is left to UE implementation.

In some implementations, a UE may receive an SDT configuration via DL control signaling (e.g., an RRC Release message) from its serving cell (e.g., a TN cell). The SDT configuration may enable the UE to implement an SDT procedure with an activated Signaling Radio Bearer (e.g., SRB2). For example, the UE may receive an SDT-Config with an IE sdt-SRB2-Indication-r17={allowed}, enabling the UE to initiate or reactivate its SRB2 after the UE chooses to initiate an SDT procedure. An example of the data structure of the SDT-Config (e.g., which is denoted as SDT-Config-r17 in Table 7) is provided in the below Table 7.

TABLE 7

```
SDT-Config-r17 ::=      SEQUENCE {
  sdt-DRB-List-r17                SEQUENCE (SIZE (0..maxDRB)) OF DRB-Identity
OPTIONAL,   -- Need M
  sdt-SRB2-Indication-r17                                  ENUMERATED {allowed}
OPTIONAL,   -- Need R
  sdt-MAC-PHY-CG-Config-r17                  SetupRelease {SDT-CG-Config-r17}
OPTIONAL,   -- Need M
  sdt-DRB-ContinueROHC-r17                              ENUMERATED { cell, rna }
OPTIONAL    -- Need S
}
```

IE sdt-SRB2-Indication (which is denoted as "sdt-SRB2-Indication-r17" in Table 7) may indicate whether the SRB2 is configured for SDT (procedures) or not in some implementations.

UE's Capability to SRB-SDT with a Serving NTN Cell

When the UE moves from a TN cell to an NTN cell, a problematic scenario may arise because the UE may have still stores the SDT-config and may not support initiating an SDT procedure associated with its serving cell (e.g., an NTN cell) using an activated SRB2. To address this issue, certain mechanisms are proposed below. It should be noted that in the present disclosure, an SRB-SDT procedure may refer to an SDT procedure (e.g., a CG-SDT procedure or an RA-SDT procedure) that is initiated by a UE with an activated SRB1 or SRB2.

In some implementations, the UE may initiate an SRB-SDT procedure while the UE has one or more pending packets associated with the SRB(s) (e.g., SRB1 and/or SRB2).

In some implementations, in addition to the one or more pending packets associated with the SRBs, the UE may have one or more packets associated with other radio bearers (e.g., one or more DRBs) while initiating an SRB-SDT procedure. In some implementations, the UE may initiate an SRB-SDT procedure only if all pending packets are associated with the SRBs (e.g., SRB1 and/or SRB2 and/or SRB3 and/or SRB4).

In some implementations, implementing an SRB-SDT procedure may imply that at least one SRB (e.g., SRB1 or SRB2) is resumed by the UE during the SDT/RA-SDT/CG-SDT procedure for packet exchange. In some implementations, implementing an SRB-SDT procedure may imply that only the SRB1 or the SRB2 is resumed by the UE during the SDT/RA-SDT/CG-SDT procedure for packet exchange.

In some implementations, the IE sdt-SRB2-Indication may be configured as an area-specific indicator (e.g., per cell or per RAN Notification Area). As such, the UE may release or remove this IE after the UE leaves the associated area. For example, the UE may release the stored sdt-SRB2-Indication upon leaving the cell that provides the SDT-config. In some implementations, the UE may release the stored sdt-SRB2-Indication after the UE (re)selects an NTN cell to camp on if the UE does not support the SRB-SDT procedures.

In some implementations, the UE may assess its capability for SRB resumption if the UE is triggered (e.g., by the NAS layer or by the RRC layer) to implement an SDT procedure.

In some implementations, the UE may camp on an NTN cell, which may support the SDT procedures (e.g., the RA-SDT procedures and/or the CG-SDT procedures) by broadcasting a corresponding SDT configuration (e.g., SDT-ConfigCommon) in the system information.

In some implementations, the SDT-ConfigCommon may be transmitted by a TN cell or an NTN cell via a SIB1 (e.g., through a broadcasting approach or a UE-specific dedicated control signaling delivery approach).

An example of the data structure of an SDT-Config is provided in Table 8 below.

TABLE 8

```
SDT-Config-r17 ::=      SEQUENCE {
  sdt-DRB-List-r17                      SEQUENCE (SIZE (0..maxDRB)) OF DRB-Identity
OPTIONAL,   -- Need M
  sdt-SRB2-Indication-r17    ENUMERATED {allowed}
    sdt-SRB3-Indication-r17    ENUMERATED {allowed}
    sdt-SRB4-Indication-r17    ENUMERATED{allowed}
OPTIONAL,   -- Need R
  sdt-MAC-PHY-CG-Config-r17                    SetupRelease {SDT-CG-Config-r17}
OPTIONAL,   -- Need M
  sdt-DRB-ContinueROHC-r17                          ENUMERATED { cell, rna }
OPTIONAL    -- Need S
```

From the UE's perspective, support for an SRB-SDT procedure associated with an NTN cell may be variable. Therefore, in some scenarios, the UE may choose to initiate an SDT/RA-SDT/CG-SDT/SRB-SDT procedure associated with an NTN cell without resuming or re-activating the SRB1/SRB2/SRB3/SRB4, if the UE does not support using the SRB1/SRB2/SRB3/SRB4 during the SDT/RA-SDT/CG-SDT/SRB-SDT procedure associated with the NTN cell.

In some implementations, the UE may be configured with an IE sdt-SRB2-Indication set to "allowed" (e.g., sdt-SRB2-Indication={allowed}), which may enable the UE to resume or re-activate the pending or stored SRB1/SRB2 during an SDT/RA-SDT/CG-SDT/SRB-SDT procedure associated with an NTN cell. The UE may be configured with sdt-SRB2-Indication={allowed} by receiving the SDT-config via UE-specific RRC signaling or by receiving the SDT-configCommon via broadcast system information.

The UE, however, may or may not have the capability to transmit or receive the SRB1/SRB2/SRB3/SRB4 during an SDT/CG-SDT/RA-SDT procedure associated with an NTN cell. In such conditions, if the stored SDT-config includes an IE sdt-SRB2-Indication-r17 set to ENUMERATED {allowed} (e.g., sdt-SRB2-Indication-r17=ENUMERATED {allowed}), the UE may be prohibited from initiating the SDT/CG-SDT/RA-SDT procedure associated with the NTN cell. Additionally, the UE that does not support the SRB-SDT procedures may be able to (or be allowed to) initiate an SDT/CG-SDT/RA-SDT procedure associated with an NTN cell (1) if the stored SDT-config does not include an IE sdt-SRB2-Indication (e.g., the IE sdt-SRB2-Indication-r17 as per the 3GPP specifications) or (2) if the stored SDT-config includes the IE sdt-SRB2-Indication that is set to ENUMERATED {not allowed}. In some implementations, the UE may be prohibited from initiating an SDT/RA-SDT/CG-SDT procedure associated with the serving NTN cell if there are any pending packets associated with the SRB1/SRB2. In other words, a UE that does not support the SRB-SDT procedures may be able to initiate an SDT/CG-SDT/RA-SDT procedure if none of the pending packets is associated with the SRB1 and/or the SRB2.

In some implementations, a UE that does not support the SRB-SDT procedures may need to resume the RRC connection to transition to the RRC CONNECTED state for packet transmission if there is any pending packets associated with the SRB1/SRB2. In some implementations, the UE may not (or may not be allowed/enabled to) initiate an SDT/CG-SDT/RA-SDT/SRB-SDT procedure associated with its serving NTN cell if the UE does not support the SRB-SDT procedures. In some implementations, the UE (e.g., the RRC entity of the UE) may inform the upper layers (e.g., the NAS layer, which instructs/initiates the SDT procedure or the UL packet transmission request) that the prerequisites for initiating/performing an SDT procedure are not met because the UE does not support the SRB-SDT procedures associated with the serving RAN (e.g., the serving NTN cell). As a result, the SDT procedure may not be triggered. In some implementations, the lower layer (e.g., the RRC layer or the MAC layer) may transmit a failure cause (e.g., such as 'the UE does not support the SRB-SDT procedures associated with the serving network') to the upper layers of the UE (e.g., the NAS layer).

In some implementations, a UE that does not support the SRB-SDT procedures associated with an NTN cell may initiate an SDT/RA-SDT/CG-SDT procedure associated with the serving NTN cell (only) if there are no pending packets associated with the SRB1/SRB2/SRB3/SRB4. In some implementations, the pending packets (associated with the SRB1/SRB2) may be considered as 'not configured for the SDT procedures,' even if the UE is configured with the sdt-SRB2-Indication=ENUMERATED {allowed} in the stored SDT-config. It should be noted that the UE may transition between the NTN and the TN cells within the same serving Radio Access Network. Therefore, after the UE switches from an NTN cell to a serving TN cell, such as during a cell (re)selection, any pending packets associated with the SRB1/SRB2/SRB3/SRB4 may be considered by the UE as 'configured for the SDT procedures,' even if the UE is configured with the sdt-SRB2-Indication=ENUMERATED {allowed} in the stored SDT-config.

In some implementations, the UE may ignore the sdt-SRB2-Indication stored in the SDT-Config if the UE chooses to initiate an SDT/RA-SDT/CG-SDT procedure associated with an NTN cell. The UE may consider that the SRB1/SRB2/SRB3/SRB4 is not initiated with the SDT/RA-SDT/CG-SDT procedure associated with the serving NTN cell if the UE does not support the SRB-SDT procedures. In such cases, the UE may not consider/count the pending packets associated with the SRB1/SRB2 when calculating the total number of pending packets for the SDT initiation. In some implementations, the UE may resume the SRB1/SRB2 for an SDT/RA-SDT/CG-SDT procedure only if the UE supports the SRB-SDT procedures. In such cases, the UE may consider or count the pending packets associated with the SRB1/SRB2 when calculating the total number of pending packets for the SDT initiation.

In some implementations, the UE may be configured with an sdt-SRB2-Indication={allowed}, which enables the UE to resume/re-activate the pending/stored SRB1/SRB2 if the UE initiates an SDT/RA-SDT/CG-SDT procedure associated with a serving NTN cell but the UE does not support packet transmissions/receptions via the SRB1/SRB2 to the serving NTN cell during the SDT/RA-SDT/CG-SDT procedure. In some implementations, the UE may further release or remove the stored SDT-Config after/at the time the UE reselects an NTN cell to camp on. In some implementations, the UE may release or remove the stored SDT-Config after/at the time the UE is requested/configured by the upper layers to initiate an SDT/CG-SDT/RA-SDT/SRB-SDT procedure (e.g., regardless of whether there are any pending packets associated with the SRB1/SRB2). In some implementations, the UE may release or remove the stored SDT-Config after/at the time the UE is requested/configured by the upper layers to initiate an SDT/CG-SDT/RA-SDT/SRB-SDT procedure (only) if there are any pending packets associated with the SRB1/SRB2.

In some implementations, if one or more new packets associated with the SRB1/SRB2/SRB3/SRB4 arrive in the UE's buffer and the UE does not support SRB1/SRB2 resumption with an NTN cell during an SDT procedure, the UE may terminate the active/activated SDT/CG-SDT/RA-SDT procedure.

By referring to 3GPP technical specifications, in some implementations, Signaling Radio Bearers" (SRBs) are defined as Radio Bearers (RBs) that are used only for the transmission of RRC and NAS messages. More specifically, the following SRBs are defined:

- SRB0 is for RRC messages using the CCCH logical channel;
- SRB1 is for RRC messages (which may include a piggybacked NAS message) as well as for NAS messages prior to the establishment of SRB2, all using DCCH logical channel;
- SRB2 is for NAS messages and for RRC messages which include logged measurement information, all using DCCH logical channel. SRB2 has a lower priority than SRB1 and may be configured by the network after AS security activation;
- SRB3 is for specific RRC messages when UE is in (NG)EN-DC or NR-DC, all using DCCH logical channel;
- SRB4 is for RRC messages which include application layer measurement report information, all using DCCH logical channel. SRB4 has a lower priority than SRB1 and can only be configured by the network after AS security activation. Please also note, the SRB-SDT procedure or designs in this document (e.g., disclosed based on SRB2) may also be applicable to SRB3/SRB4.

In some implementations, the UE may keep or retain the stored SDT configuration (e.g., the stored SDT-config received from the UE's serving RAN, which may include at least one of the following: one or more NTN cells, one or more TN cells, one or more TN BSs, one or more NTN BSs, one or more NTN gateways, and one or more NTN payloads) after/at the time the UE reselects an NTN cell to camp on (only) if the UE does support the SRB-SDT procedures associated with the NTN cell (e.g., the UE's capability regarding the SRB-SDT procedures in the NTN-parameters is marked as "supported").

In some implementations, the UE may keep or retain the stored SDT configuration (e.g., the stored SDT-config received from the UE's serving RAN) after/at the time the UE reselects an NTN cell to camp on, despite the UE not supporting the SRB-SDT procedures associated with the NTN cell (e.g., the UE's capability regarding the SRB-SDT procedures in the NTN-parameters is absent or is marked as "not supported").

In some implementations, the UE may keep or retain the stored SDT configuration (e.g., the stored SDT-config received from the UE's serving TN or NTN cell) after the UE is triggered by the upper layers to initiate an SDT/RA-SDT/CG-SDT/SRB-SDT procedure associated with its current serving cell (e.g., the currently camped NTN cell), even if the UE does not support the SRB-SDT procedures associated with the current serving cell.

In some implementations, the UE may release the stored SDT configuration (e.g., the stored SDT-config received from the UE's serving RAN) if the UE is configured to prioritize the NTN cells over the TN cells (e.g., by giving a higher priority to the NTN cells compared to the TN cells) for a cell (re)selection procedure and the UE does not support the SRB-SDT procedures associated with the NTN cells.

In some implementations, the UE may keep or retain the stored SDT configuration (e.g., the stored SDT-config received from the UE's serving RAN) even if the UE is configured to prioritize the NTN cells over the TN cells (e.g., by giving higher priority to the NTN cells compared to the TN cells) for a cell (re)selection procedure and if the UE does not support the SRB-SDT procedures associated with the NTN cells.

In some implementations, the UE may be configured with an sdt-SRB2-Indication={allowed}, which enables the UE to resume/re-activate the pending/stored SRB1/SRB2 if the UE initiates an SDT/RA-SDT/CG-SDT procedure associated with an NTN cell and does not support packets transmission/reception via the SRB1/SRB2/SRB3/SRB4 to a serving NTN cell during the SDT/RA-SDT/CG-SDT/SRB-SDT procedure. In some implementations, the UE may transition to the RRC IDLE state after/at the time the UE reselects an NTN cell to camp on. In some implementations, the UE may transition to the (E-UTRA/NR) RRC IDLE state after/at the time the UE is requested/configured by the upper layers to initiate an SDT/CG-SDT/RA-SDT procedure (e.g., regardless of whether there are any pending packets associated with the SRB1/SRB2). In some implementations, the UE may transition to the RRC IDLE state after/at the time the UE is requested/configured by the upper layers to initiate an SDT/CG-SDT/RA-SDT procedure (only) if there are any pending packets associated with the SRB1/SRB2/SRB3/SRB4.

In some implementations, a UE, that does not support the SRB-SDT procedures associated with the NTN cells (e.g., the UE's capability in the NTN-parameters regarding the SRB-SDT procedures is marked as "not supported" or is absent), may stay in the RRC INACTIVE state after/at the time the UE (re)selects an NTN cell to camp on. In such cases, the UE may or may not release the stored SDT configuration received from the serving RAN. In some implementations, the UE may re-apply/reuse the stored SDT configuration next time the UE switches from the NTN cell to a TN cell with which the UE supports the SDT procedures. Additionally, in some implementations, if the stored SDT configuration (e.g., the SDT-config) has been kept/stored by the UE, the stored SDT configuration may be released by the UE (only) if the UE, that does not support an SRB-SDT procedure associated with the serving NTN cell, receives instructions from the upper layers to initiate the SRB-SDT procedure (e.g., for SRB1/SRB2/SRB3/SRB4 control signaling transmission). In some implementations, if the stored SDT configuration (e.g., the SDT-config) has been kept/stored by the UE, the UE, that does not an SDT/RA-SDT/CG-SDT/SRB-SDT procedure, may not release the stored SDT configuration even if the UE receives instructions from the upper layers to initiate the SDT/RA-SDT/CG-SDT procedure.

In some implementations, a UE, which does not support the SRB-SDT procedures associated with an NTN cell (e.g., the UE's capability in the NTN-parameters regarding the SRB-SDT procedures is marked as "not supported" or is absent), may transition to the RRC IDLE state after/at the time the UE (re)selects the NTN cell to camp on. Additionally, in some implementations, the UE may release the stored SDT configuration (e.g., the stored SDT-config received by the UE from the UE's serving RAN) after/at the time the UE (re)selects the NTN cell to camp on.

In some implementations, the UE may inform the serving RAN (e.g., including a combination of at least one TN cell and at least one NTN cell) whether the UE supports the SRB-SDT procedures associated with the NTN cells via a UE capability enquiry procedure (e.g., as illustrated in FIG. 2A) or a UEAssistanceInformation delivery procedure (e.g., as illustrated in FIG. 2B).

In some implementations, the UE may or may not support the SRB-SDT procedures associated with the NTN cells. In some implementations, the UE may automatically support the SRB-SDT procedures associated with the NTN cells if the UE has transmitted its capability regarding the SDT procedures to the network.

In some implementations, the UE's capability may be changed temporally at the UE side due to one or more reasons (e.g., manual operation, overheating problem, co-existence problem in hardware modules, etc.). In some implementations, the UE may change its capability/support about the SDT/CG-SDT/RA-SDT/SRB-SDT procedures and report to the serving NTN cell (or serving TN cell) whether the UE currently supports the SDT/CG-SDT/RA-SDT/SRB-SDT procedures or not. Under such a condition, in some implementations, the UE's capability may change temporarily at the UE side due to various reasons, such as manual operation, overheating, co-existence issues in hardware modules, etc. In some implementations, the UE may change its capability/support regarding the SDT/CG-SDT/RA-SDT/SRB-SDT procedures and report to the serving NTN cell (or serving TN cell) whether the UE supports the SDT/CG-SDT/RA-SDT/SRB-SDT procedures or not. Under such a condition, the UE may present at least one of the following behaviors (1) and (2):

(1) While the UE is in the RRC CONNECTED state, the UE may report or update its most recent capability (e.g., whether or not the SRB-SDT procedures associated with the TN access or the NTN access is supported) to its serving cell.

(2) While the UE is in the RRC IDLE/INACTIVE state, the UE may not report its most recent capability (e.g., whether or not the SRB-SDT procedures associated with the TN access or the NTN access is supported) to its serving cell. It should be noted that in behavior (2), the UE may or may not release the stored SDT-config if the UE's capability has been changed. In some implementations, the UE may be triggered to initiate an RRC Resume procedure to the UE's capability change in supporting the SRB-SDT procedures.

In some implementations, the UE may not release the stored SDT-Config if/after/at the time the UE transitions from the capability status of "SRB-SDT procedures are supported" to "SRB-SDT procedures are not supported." In some implementations, the UE may release the stored SDT-Config if/at the time/after the UE transitions from the capability status of "SRB-SDT procedures are supported" to "SRB-SDT procedures are not supported."

In some implementations, the UE may transition from the (NR/E-UTRA) RRC INACTIVE state to the (NR/E-UTRA) RRC IDLE state if/at the time/after the UE transitions from the capability status of "SRB-SDT procedures are supported" to "SRB-SDT procedures are not supported." In some implementations, the UE may stay in the RRC INACTIVE state if/at the time/after the UE transitions from the capability status of "SRB-SDT procedures are supported" to "SRB-SDT procedures are not supported."

In some implementations, an NTN cell may not configure or transmit an SDT/CG-SDT/RA-SDT/SRB-SDT configuration to a UE via an RRC Release (or "RRCRelease") message if the UE does not support the SRB-SDT procedures associated with the NTN cells. For example, if the UE does not support the SRB-SDT procedures associated with the NTN cells, the UE may not expect to receive an SDT-config, which may include parameters/configurations for CG-SDT/RA-SDT/SRB-SDT procedures, from a serving NTN cell during the stage when the UE is receiving/monitoring an RRC (Connection) Release message.

In some implementations, the NTN cell may transmit the SDT configuration to the UE via UE-specific DL control signaling (e.g., an RRC Release message), regardless of whether the UE supports the SDT/CG-SDT/RA-SDT/SRB-SDT procedures associated with the NTN cells. For example, the UE may apply the received SRB-SDT configuration to initiate or perform an SRB-SDT procedure if the UE becomes supporting the SRB-SDT procedures. In some implementations, the SDT/CG-SDT/RA-SDT/SRB-SDT configuration provided by the serving NTN cell may be associated with a TN cell (or TN access). In such cases, the UE may store this SDT/CG-SDT/RA-SDT/SRB-SDT configuration associated with the TN cell. Subsequently, when the UE moves to or selects a TN cell that supports the SDT/CG-SDT/RA-SDT/SRB-SDT procedures, the UE may initiate a corresponding SDT/CG-SDT/RA-SDT/SRB-SDT procedure based on the stored SDT/CG-SDT/RA-SDT/SRB-SDT configuration, which was transmitted by the previously serving NTN cell. Additionally, in some implementations, the UE may (re)select a TN cell to camp on in response to the instruction from the UE's serving NTN cell. The instruction may be included in redirected carrier information (or "re-directedcarrierinformation"), UE-specific control signaling, or broadcast system information. In some implementations, the SDT/CG-SDT/RA-SDT/SRB-SDT configuration may be further associated with a validity period. In such cases, the UE may store/keep the SDT/CG-SDT/RA-SDT/SRB-SDT configuration (only) for the duration of the valid period.

In some implementations, the UE may be configured with a high priority value for the NTN cells/NTN access during the cell (re)selection procedure. This configuration may be set through various means, such as pre-configuration, pre-installation in the USIM, broadcast system information, and/or UE-specific downlink control signaling. Despite this, the UE may also be configured with an SDT-config for an SDT procedure. Under such a condition, the UE may present at least one of the following behaviors (1) to (3):

(1) The UE may temporarily ignore the received NTN prioritization rules (e.g., the high priority value for the NTN cells/NTN access) and attempt to (re)select a TN cell if the UE is triggered by upper layers (e.g., the RRC layer) to initiate the SDT procedure.

(2) The UE may follow/obey the received NTN prioritization rules and attempt to (re)select an NTN cell for an initiated SDT procedure or for initiating an SDT procedure (only) if the UE supports the SDT/RA-SDT/CG-SDT/SRB-SDT procedures associated with the NTN cell.

(3) The UE may follow/obey the received NTN prioritization rules and attempt to (re)select an NTN cell, even if the UE has a stored SDT-config but does not support the SDT/RA-SDT/CG-SDT/SRB-SDT procedures associated with the NTN cells or NTN access.

In some implementations, the cell/gNB/BS (e.g., a TN cell/TN BS) may not transmit an SDT-related configuration associated with a specific UE (e.g., the SDT-config as per 3GPP specifications) to an NTN cell/NTN BS if the UE is not capable of implementing an SDT procedure on the NTN cell/NTN BS. In some implementations, the cell/gNB/BS (e.g., a TN cell/TN BS) may transmit an SDT-related configuration associated with a specific UE (e.g., the SDT-config as per 3GPP specs) to an NTN cell/NTN BS, even if the UE is not capable of implementing an SDT procedure associated with the NTN cell/NTN BS.

An example of the conditions for initiating an SDT procedure is shown in Table 9 below, which presents an example implementation in which the UE's capability is taken into account when the UE is requested to resume an RRC connection for an SDT procedure initiation.

mission are generally maintained by the network in the RRC INACTIVE state. Until Rel-16, the UE was not allowed to perform data transmission in the RRC INACTIVE state. Hence, the UE had to resume the connection (e.g., move to an RRC CONNECTED state) for any DL reception and/or any UL data transmission. A connection setup and a subsequently release to the INACTIVE state had to occur for each data transmission regardless of how small and infrequent the data packets are. This may result in an unnecessary power consumption and signal overhead.

Signaling overhead from the RRC Inactive state UEs due to transmission of small data is a general problem and may become a critical issue as the number of UEs increases in a network, not only for the network performance and efficiency, but also for the UE battery performance. In general, any device that has intermittent small data packet transmission and/or receptions in the RRC Inactive state may benefit from enabling the SDT procedure in the RRC Inactive state.

RRC INACTIVE State

Figure 3:
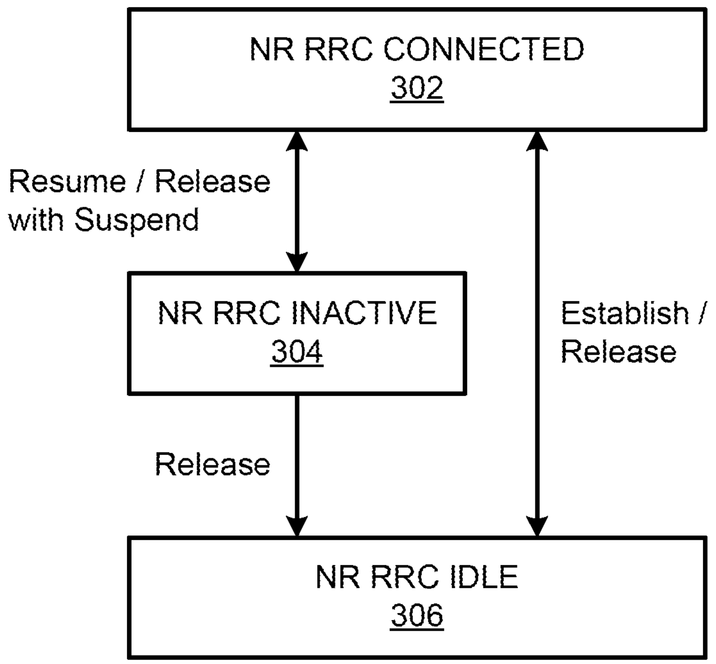
FIG. 3 is a diagram illustrating an overview of a UE's Radio Resource Control (RRC) states transitions, according to an example implementation of the present disclosure.

FIG. 3 is a diagram illustrating an overview of a UE's RRC states transitions, according to an example implementation of the present disclosure. The RRC states include NR RRC CONNECTED state 302, NR RRC INACTIVE state 304 and NR RRC IDLE state 306. As illustrated in FIG. 3, the UE has only one RRC state in NR at a time.

The RRC INACTIVE state (e.g., NR RRC INACTIVE state 304) is a state where a UE remains in a CM (Connection Management)-CONNECTED state and may move within an area configured by the NG-RAN (e.g., the RNA) without notifying the NG-RAN. In the RRC INACTIVE state, the last serving gNB node keeps the UE context and the UE-associated NG connection with the serving Access and Mobility management Function (AMF) and User Plane Function (UPF).

TABLE 9

| Conditions for initiating SDT |
|---|
| A UE in RRC INACTIVE initiates the resume procedure for SDT when all of the following conditions are fulfilled: |
| 1> the upper layers request resumption of RRC connection; and |
| 1> SIB1 includes sdt-ConfigCommon; and |
| 1> sdt-Config is configured; and |
| 1> all the pending data in UL is mapped to the radio bearers configured and supported by the UE for SDT; and |
| 1> lower layers indicate that conditions for initiating SDT as specified in TS 38.321 [3] are fulfilled. |

NOTE:
How the UE determines that all pending data in UL is mapped to radio bearers configured for SDT is left to UE implementation.

According to various implementations of the present disclosure, the mutual impacts of SDT procedures and the NTN cells are analyzed, considering whether the UE supports an SDT procedure associated with a serving NTN cell. Additionally, a serving RAN of the UE may include one or more NR/E-UTRA cells, making the mechanisms proposed in the present disclosure potentially applicable to, but not limited to, 4G/5G E-UTRA protocols/systems and/or 5G NR protocols/systems. For example, the proposed mechanisms may also be applicable to eMTC and/or NB-IoT over the TN and/or the NTN. Furthermore, the proposed mechanisms may be applicable to the UEs or network nodes that are operating on various types of bands, including licensed bands, shared bands, unlicensed bands, ITS bands, and satellite bands.

Small Packet Transmission (SDT) During an RRC INACTIVE State

NR supports the RRC INACTIVE state and UEs with infrequent (e.g., periodic and/or non-periodic) data trans- The RRC INACTIVE state may support at least the following functions: a Public Land Mobile Network (PLMN) selection, a broadcast of system information, a cell re-selection mobility, a paging initiated by the NG-RAN (e.g., RAN paging), a RAN-based notification area (RNA) managed by the NG-RAN, a DRX for RAN paging configured by the NG-RAN, a 5GC-NG-RAN connection (e.g., both C/U-planes) established for the UE, the UE (e.g., in an Inactive state) AS context stored in the NG-RAN, and the UE, the NG-RAN knows the RNA to which the UE belongs.

For an NR connected to the 5GC, the UE identity, Inactive-RNTI (I-RNTI), may be used to identify the UE context in an RRC INACTIVE state. The I-RNTI provides the new NG-RAN node a reference to the UE context in the old NG-RAN node. How the new NG-RAN node is able to resolve the old NG-RAN ID from the I-RNTI is a matter of proper configuration in the old and new NG-RAN nodes. Some typical partitioning of a 40 bit I-RNTI assumes the following contents:

UE specific reference: reference to the UE context within a logical NG-RAN node;

NG-RAN node address index: information to identify the NG-RAN node that has allocated the UE specific part;

PLMN-specific information: information supporting network sharing deployments, providing an index to the PLMN ID part of the Global NG-RAN node identifier; and Stand-alone Non-Public Network (SNPN) specific information: SNPN may be a small PLMN configured by the operator. Each SNPN may be identified by a unique SNPN identity (e.g., an identifier of an SNPN comprising of a PLMN ID and a network identifier (NID) combination). A configured grant configuration may be associated with an SNPN ID.

UE Inactive AS Context: UE Inactive AS Context is stored when the connection is suspended (when the UE is in RRC INACTIVE state) and restored when the connection is resumed (e.g., when the UE is transited from RRC INACTIVE to RRC CONNECTED state).

The suspension of the RRC connection is initiated by the network. When the RRC connection is suspended, the UE stores the UE Inactive AS context and any configuration received from the network, and transitions to an RRC INACTIVE state. If the UE is configured with SCG, the UE releases the SCG configuration upon initiating an RRC Connection Resume procedure. The RRC message to suspend the RRC connection is integrity protected and ciphered. The resumption of a suspended RRC connection is initiated by the upper layers (e.g., when the UE needs to transit from RRC INACTIVE state to RRC CONNECTED state) or by the RRC layer (e.g., to perform an RNA update or by RAN paging from NG-RAN). When the RRC connection is resumed, the network configures the UE according to the RRC connection resume procedure based on the stored UE Inactive AS context and any RRC configuration received from the network. The RRC connection resume procedure re-activates AS security and re-establishes the SRB(s) and DRB(s).

In response to a request to resume the RRC connection, the network may resume the suspended RRC connection and send the UE to an RRC CONNECTED state, or reject the request to resume and send the UE to an RRC INACTIVE (with a wait timer) state, or may directly re-suspend the RRC connection and send the UE to an RRC INACTIVE state, or may directly release the RRC connection and send the UE to an RRC IDLE state, or may instruct the UE to initiate a NAS level recovery (e.g., in a case that the network sends an RRC setup message).

In addition, in the RRC INACTIVE state, a UE specific discontinuous reception (DRX) may be configured by the upper layers or by the RRC layer, a UE controlled mobility may be based on a network configuration, the UE may store the UE Inactive AS context, and a RAN-based notification area may be configured by the RRC layer. Furthermore, the UE may perform at least one of the following behaviors in the RRC INACTIVE state:

Monitors Short Messages transmitted with P-RNTI over DCI;

Monitors a Paging channel for CN paging using 5G-S-TMSI and RAN paging using full I-RNTI;

Performs neighboring cell measurements and cell (re-) selection;

Performs RAN-based notification area updates periodically and when moving outside the configured RAN-based notification area; and Acquires system information and can send SI request (if configured).

Figure 4:
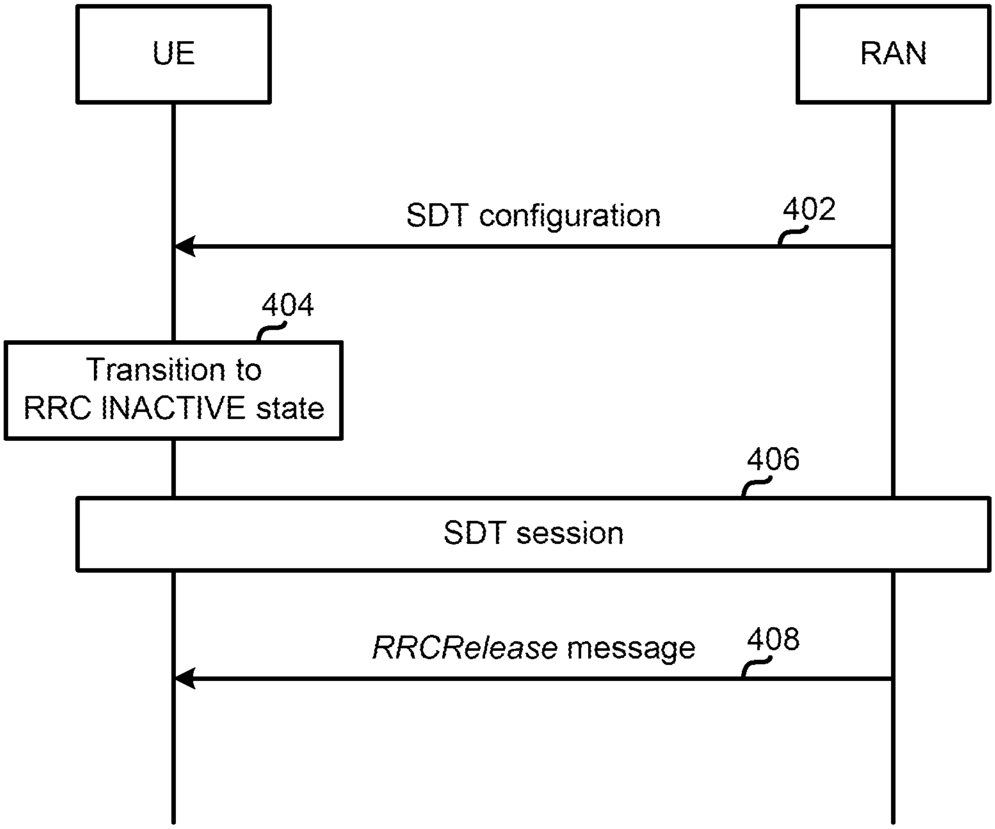
FIG. 4 is a diagram illustrating a procedure of establishing a Small Data Transmission (SDT) session, according to an example implementation of the present disclosure.

FIG. 4 is a diagram illustrating a procedure of establishing an SDT session, according to an example implementation of the present disclosure.

In action 402, the UE may receive an SDT configuration from the serving RAN via DL UE-specific signaling (e.g., through an RRC Reconfiguration (or "RRCReconfiguration") message and/or an RRCRelease message). The SDT configuration may be from a first serving cell of the serving RAN associated with the UE. The first serving cell may configure the UE with UL-CG configurations (e.g., CG-PUSCH resource configurations) and/or UE-specific/common RA resources. This enables the UE to implement SDT (e.g., an SDT procedure) after transitioning to the RRC INACTIVE state.

In action 404, the UE may transition to the RRC INACTIVE state (e.g., after receiving an RRCRelease message from the first serving cell, where the RRCRelease message instructs the UE to transition to the RRC INACTIVE state). In some implementations, the CG-PUSCH resource and/or the RA resource configuration may locate on a (normal) UL carrier (e.g., a UL carrier or an NUL carrier) or an SUL carrier. After receiving the SDT configuration and while in the RRC CONNECTED state, the UE may store the SDT configuration to use after transitioning to the RRC INACTIVE state. The UE may still keep or retain the SDT configuration after transitioning to the RRC INACTIVE state.

In action 406, when one or more packets (belonging to the SDT radio bearers, which may also be configured in the SDT configuration) arrive, the UE may initiate an SDT session with a second serving cell of the serving RAN accordingly. The initiation of the SDT session may be done, for example, by transmitting the encoded packets on the configured UL-CG directly, with or without transmitting an RRCResumeRequest message. Alternatively, a preamble may be transmitted first, with or without attaching encoded packets, during a 2-step RA procedure that is triggered as part of the SDT session. An alternative may be transmitting a preamble as MSG1 followed by an RRCResumeRequest message/an encoded packet in a 4-step RA procedure. It should be noted that the second serving cell may be the same as the first serving cell in some scenarios, or different from the first serving cell in other scenarios. After the UE initiates the SDT session, the serving cell (e.g., the first or the second serving cell) may continue the SDT (procedure) by transmitting DL packets to the UE or by providing dynamic UL grants to the UE for subsequent DL/UL packet exchanges. In some implementations, HARQ protocols may be configured as part of the SDT configuration and may be implemented during the DL/UL packet exchanges in the SDT session.

In action 408, to finish the active SDT session, the second serving cell may transmit another RRCRelease message to instruct the UE to terminate the SDT session. The UE may keep or retain the stored SDT configuration and remain in the RRC INACTIVE state after receiving the RRCRelease message.

Uplink Configured Grant (UL-CG) Configuration (for SDT Configuration) & CG-SDT Procedures In the uplink, a base station (e.g., a gNB) may dynamically allocate resources to the UEs via the C-RNTI on PDCCH(s). A UE always monitors the PDCCH(s) in order to find possible (dynamic) grants for uplink transmission when its downlink reception is enabled (e.g., the activity governed by a DRX when configured). When Carrier Aggregation (CA) is configured, the same C-RNTI applies to all serving cells.

In addition, with Configured Grants, the gNB may allocate uplink resources for the initial HARQ transmissions to the UEs. Two types of configured uplink grants are defined:

With Type 1, RRC directly provides the configured uplink grant (including the periodicity).

With Type 2, RRC defines the periodicity of the configured uplink grant while PDCCH addressed to CS-RNTI may either signal and activate the configured uplink grant, or deactivate it (e.g., a PDCCH addressed to CS-RNTI indicates that the uplink grant can be implicitly reused according to the periodicity defined by the RRC, until deactivated).

Type 1 and Type 2 are configured by RRC per Serving Cell and per BWP. Multiple configurations can be activated simultaneously only on different Serving Cells. For Type 2, activation and deactivation are independent among the Serving Cells. For the same Serving Cell, the MAC entity is configured with either Type 1 or Type 2.

RRC configures the following parameters when the configured grant Type 1 is configured:

cs-RNTI: CS-RNTI for retransmission;

periodicity: periodicity of the configured grant Type 1;

timeDomainOffset: Offset of a resource with respect to SFN=0 in time domain;

timeDomainAllocation: Allocation of configured uplink grant in time domain which contains startSymbolAndLength (e.g., Start and Length Indicator Value (SLIV) in the 3GPP TS 38.214);

nrofHARQ-Processes: the number of HARQ processes for configured grant.

Upon configuration of a configured grant Type 1 for a serving cell by upper layers, the MAC entity may:

store the uplink grant provided by upper layers as a configured uplink grant for the indicated serving cell; and/or initialize or re-initialize the configured uplink grant to start in the symbol according to timeDomainOffset and S (derived from SLIV as specified in the 3GPP TS 38.214), and to reoccur with periodicity.

RA Procedure & RA Resource Configuration (for SDT Configuration) & RA-SDT Procedures Based on the 3GPP technical specifications, two types of random access procedures are supported:

4-step RA type (with MSG1), such as contention-free random access (CFRA) and/or 4-step contention-based random access (CBRA).

2-step RA type (with MSGA), such as, 2-step CFRA and/or 2-step CBRA.

Two types of RA procedure are supported: 4-step RA type with MSG1 and 2-step RA type with MSGA. Both types of RA procedure support CBRA and CFRA.

The UE selects the type of random access at initiation of the RA procedure based on the network configuration:

when CFRA resources are not configured, an RSRP threshold is used by the UE to select between 2-step RA type and 4-step RA type;

when CFRA resources for 4-step RA type are configured, UE performs random access with 4-step RA type;

when CFRA resources for 2-step RA type are configured, UE performs random access with 2-step RA type.

The network does not configure CFRA resources for 4-step and 2-step RA types at the same time for a BWP. CFRA with 2-step RA type is only supported for handover.

The MSGA of the 2-step RA type includes a preamble on PRACH and a payload on PUSCH. After MSGA transmission, the UE monitors for a response from the network within a configured window. For CFRA, upon receiving the network response, the UE ends the RA procedure. For CBRA, if contention resolution is successful upon receiving the network response, the UE ends the RA procedure; while if fallback indication is received in MSGB, the UE performs MSG3 transmission and monitors contention resolution. If contention resolution is not successful after MSG3 (re) transmission(s), the UE goes back to MSGA transmission.

If the RA procedure with 2-step RA type is not completed after a number of MSGA transmissions, the UE can be configured to switch to CBRA with 4-step RA type.

For random access in a cell configured with supplementary uplink (SUL), the network can explicitly signal which carrier to use (UL or SUL). Otherwise, the UE selects the SUL carrier if and only if the measured quality of the DL is lower than a broadcast threshold. UE performs carrier selection before selecting between 2-step and 4-step RA type. The RSRP threshold for selecting between 2-step and 4-step RA type can be configured separately for UL and SUL. Once started, all uplink transmissions of the RA procedure remain on the selected carrier.

When CA is configured to the UE, the UE may perform the RA procedure with 2-step RA type only on the PCell while contention resolution can be cross-scheduled by the PCell.

When CA is configured to the UE, for the RA procedure with 4-step RA type, the first three steps of CBRA procedure always occur on the PCell while contention resolution (step 4: MSG4) can be cross-scheduled by the PCell. The three steps of a CFRA procedure started on the PCell remain on the PCell. The CFRA procedure on SCell can only be initiated by the gNB to establish timing advance for a secondary TAG. The CFRA procedure is initiated by the gNB with a PDCCH order (step 0) that is sent on a scheduling cell of an activated SCell of the secondary TAG, preamble transmission (step 1: MSG1) takes place on the indicated SCell, and RA Response (step 2: MSG2) takes place on the PCell.

During an RA-SDT procedure involving a 4-step RA procedure, the UE may transmit pending data in MSG1/MSG3 and the subsequent successive UL packets during the 4-step RA procedure. The 4-step RA procedure may end after the UE receives an RRCRelease message from the serving RAN, thereby ending the active SDT procedure. During an RA-SDT procedure involving a 2-step RA procedure, the UE may transmit the pending data in MSGA and the subsequent UL packets during the 2-step RA procedure. The 2-step RA procedure may end when the UE receives an RRCRelease message from the serving RAN, thereby ending the active SDT procedure.

NTN Communication

1) Quasi-Earth Fixed Case

A quasi-earth-fixed case refers to a geographic area for one period and a different geographic period for another period. A platform such as a LEO satellite can create such quasi-earth-fixed beams if satellite beam steering is supported. Handovers typically occur in bursts for all UEs in each coverage area, e.g., every few minutes, in the quasi-earth-fixed case.

2) Earth-Moving Case

An earth-moving case refers to a different geographic area from one instant to the next. The overall coverage area of the beam keeps changing continuously. A platform such as a LEO satellite may use such Earth-moving beams and hence covers different geographic areas as the platform keeps orbiting the Earth. When an NTN cell uses an earth-moving beam, even stationary UEs experience a change in the cell frequently, e.g., every few seconds. Handovers typically occur continuously in the Earth-moving case.

3) Feeder Link Switch

In a feeder link switch case, the timing information on when a cell is going to star or stop serving the area for earth fixed scenario is broadcast to UE via system information. The feeder link switch refers to a link change between a satellite and a gateway (GW), where a GW may be collocated with a gNB. The duration of the feeder link switch is predictable based on satellite ephemeris and GW's location. The network may broadcast the feeder link switch period for UE to stop or start measurement, transmission, or reception.

Figure 5:
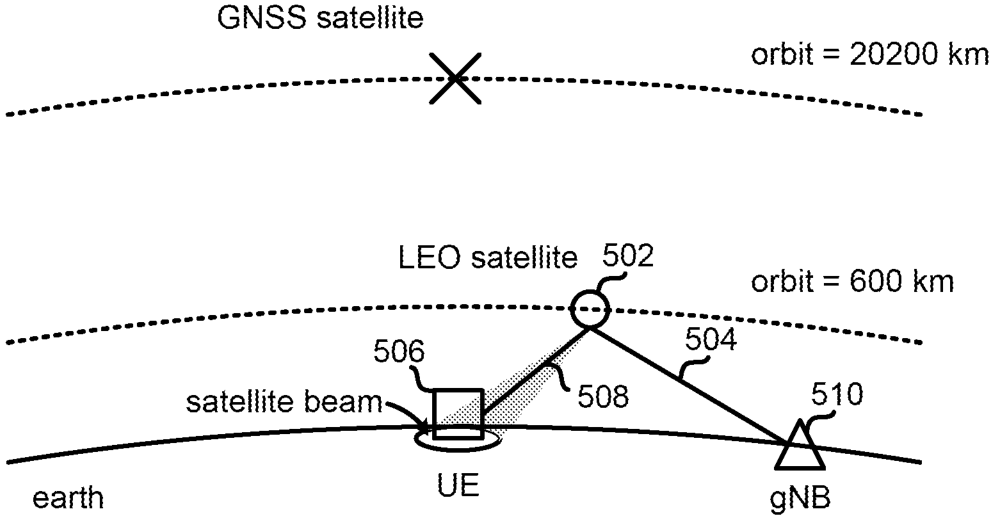
FIG. 5 is a diagram illustrating an NTN with a Low Earth Orbit (LEO) satellite of transparent payload architecture, according to an example implementation of the present disclosure.

An NTN refer to a network or at least one network segment that uses a spaceborne vehicle for transmission, e.g., LEO or GEO satellites. FIG. 5 is a diagram illustrating an NTN with an LEO satellite of transparent payload architecture, according to an example implementation of the present disclosure. As illustrated in FIG. 5, the NTN is with LEO satellite 502 of transparent payload architecture at orbit 600 kilometers (km).

An NTN typically includes at least one of the following elements: 1) a GW 2) a gNB 3) a satellite, and 4) a UE. An NTN may also include a ground or earth station including a Sat-gateway and a Telemetry, Tracking, Command, and Monitoring unit (TTC).

One or several Sat-gateways are attached to a Base Station Base Band Unit (BBU) or a gNB (e.g., gNB 510) that connects the NTN to a Core Network/Application Server. Node BBUs are close to Sat-gateways either co-located or at a few kilometers. Antenna diversity may be required depending on geographical location and feeder-link frequency band.

A satellite may be GEO or Non-GEO and may be part of a Satellite Constellation to ensure service continuity. A satellite may be served successively by one or more Sat-gateways. A Satellite Constellation Controller may provide each BS with satellite system data (ephemeris, satellite position, and velocity, etc.)

A feeder link (e.g., feeder link 504), which is a radio link conveying information for a satellite mobile service between the Sat-gateway and the satellite. The UE (e.g., UE 506) and the satellite (e.g., LEO satellite 502) may be connected via a service link (e.g., service link 508) or a radio link.

Additionally, the satellite may implement a transparent payload architecture. This transparent payload architecture performs radio frequency filtering, frequency conversion, and amplification. As a result, the waveform signal that the payload repeats may remain unchanged, except for frequency translation and transmit power. The satellite may generate multiple spot-beams that cover a given service area, which is bounded by its Field of View (FoV) or footprint. The footprints of these spot-beams usually have an elliptical shape. However, please also note the proposed mechanism would not be limited by the transparent payload architecture and can be applicable to the NTN satellites of regenerative payload architecture.

UE is GNSS capable. Support of UE Types can be handheld devices (NR and LTE smartphones), IoT devices (NB-IoT and eMTC), VSAT, moving platforms (aircraft, vessels, and building-mounted devices). The UE (e.g., UE 506) may support GNSS functionality. The supported types of UEs may include handheld devices such as NR and LTE smartphones, IoT devices like NB-IoT and eMTC, VSATs, and moving platforms like aircraft, vessels, and building-mounted devices.

Figure 6:
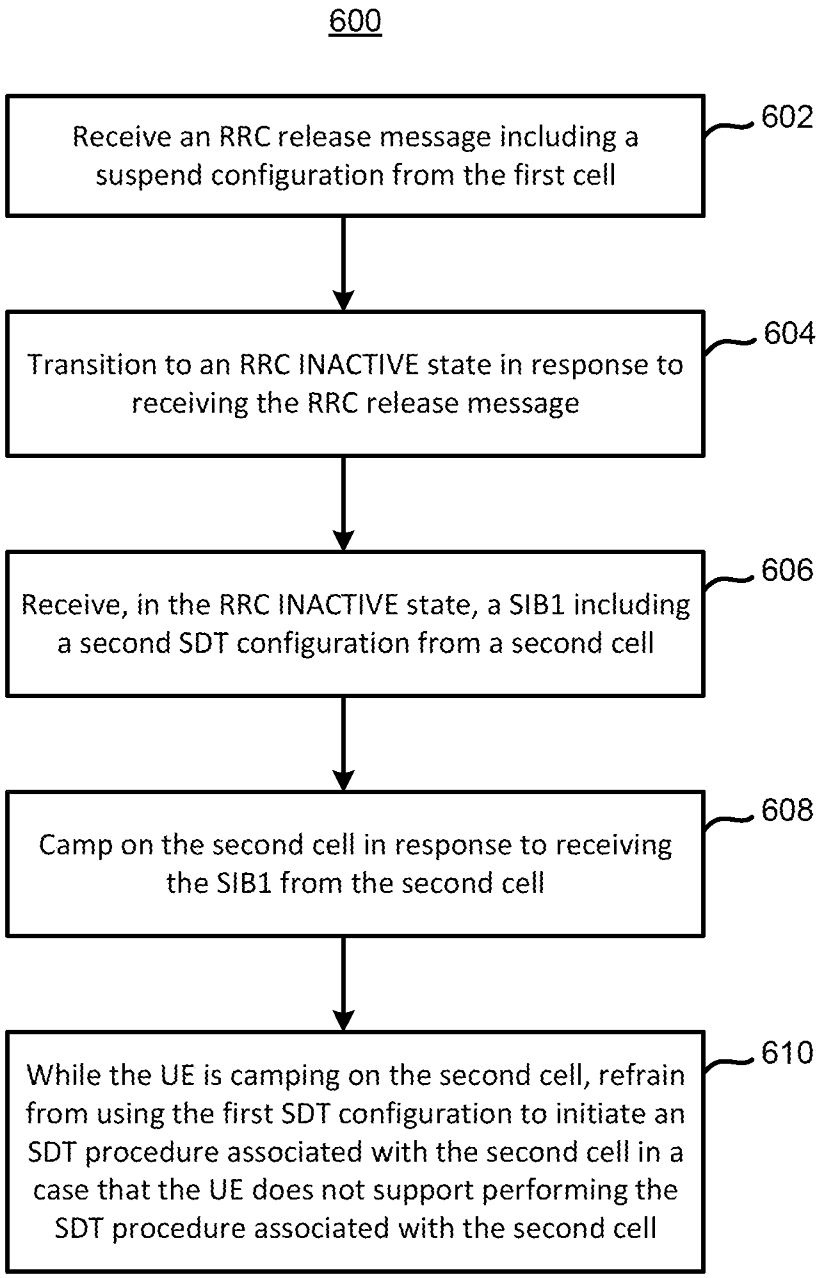
FIG. 6 is a flowchart of a method for mobility enhancement, according to an example implementation of the present disclosure.

FIG. 6 is a flowchart of a method 600 for mobility enhancement, according to an example implementation of the present disclosure. It should be noted that although actions 602, 604, 606, 608, and 610 are illustrated as separate actions represented as independent blocks in FIG. 6, these separately illustrated actions should not be construed as necessarily order-dependent. The order in which the actions are performed in FIG. 6 is not intended to be construed as a limitation, and any number of the disclosed blocks may be combined in any order to implement the method, or an alternate method. Moreover, each of actions 602, 604, 606, 608, and 610 may be performed independently of other actions and may be omitted in some implementations of the present disclosure.

In action 602, a UE, that is configured with a first SDT configuration (e.g., SDT-config) by a first cell, may receive an RRC release message including a suspend configuration (e.g., an RRCRelease message with a suspendConfig) from the first cell.

In action 604, the UE may transition to an RRC INACTIVE state in response to receiving the RRC release message.

In action 606, the UE may receive, in the RRC INACTIVE state, a SIB1 including a second SDT configuration (e.g., SDT-ConfigCommon) from a second cell.

In action 608, the UE may camp on the second cell in response to receiving the SIB1 from the second cell.

In action 610, while the UE is camping on the second cell (e.g., the second cell being the current serving cell of the UE), the UE may refrain from using the first SDT configuration to initiate an SDT procedure associated with the second cell in a case that the UE does not support performing the SDT procedure associated with the second cell.

In some implementations, the SDT procedure may include at least one of an RA-based SDT (RA-SDT) procedure, an SRB-based SDT (SRB-SDT) procedure, or a CG-based SDT (CG-SDT) procedure.

In some implementations, the first cell may include a TN cell (e.g., TN cell 104 illustrated in FIG. 1) and the second cell may include an NTN cell (e.g., NTN cell 106 illustrated in FIG. 1).

In some implementations, refraining from using the first SDT configuration (action 610) may include maintaining, but not using, the first SDT configuration while the UE is camping on the second cell. For example, in a case that the UE does not support the SDT procedures associated with the second cell, the UE may still retain the first SDT configuration while the UE is camping on the second cell, but the UE does not use the first SDT configuration to initiate or perform an SDT procedure associated with the second cell.

In some implementations, refraining from using the first SDT configuration (action 610) may include releasing the first SDT configuration while the UE is camping on the second cell. For example, in a case that the UE does not support the SDT procedure associated with the second cell, the UE may release the first SDT configuration once/after the second cell becomes the current serving cell of the UE.

In some implementations, the UE may transition to an RRC IDLE state while the UE is camping on the second cell. In the RRC IDLE state, the UE may also refrain from using the first SDT configuration to initiate an SDT procedure associated with the second cell, especially if the UE does not support the SDT procedures associated with the second cell.

In some implementations, the UE may initiate an RRC resume procedure associated with the second cell for uplink packet transmissions or UE capability reporting after camping on the second cell. For example, after the UE camps on the second cell, the UE may initiate an RRC Resume procedure to report its current capability regarding the SDT procedures and/or capability changes in the support for the SDT procedures to the second cell.

In some implementations, the UE may switch to camp on a third cell after camping on the second cell and initiate the SDT procedure associated with the third cell based on the first SDT configuration in a case that the UE supports performing the SDT procedure associated with the third cell, where the third cell may be the first cell or a cell other than the first cell.

In some implementations, while the UE is camping on the second cell, the UE may initiate the SDT procedure associated with the second cell based on the first SDT configuration and the second SDT configuration in a case that the UE supports performing the SDT procedure associated with the second cell.

In some implementations, the first cell and the second cell may be identical and may be either a TN cell or an NTN cell.

Leveraging method 600 offers technical advantages for improving 5G communications, not just for integrating NTNs but also for other types of networks. Method 600 ensures smooth transitions between cells, making the user experience and system performance better. Additionally, method 600 effectively handles SDT configurations, thereby addressing the co-existence challenges that can happen in various networking scenarios. Therefore, method 600 provides a flexible and resource-efficient way to solve challenges in network co-existence and mobility across different networks.

In some implementations, the UE may identify whether the serving cell supports one specific functionality by receiving the system information (e.g., SIB1 transmission or other SI transmission). For example, the UE may monitor whether the serving cell support small data transmission by monitoring if the serving cell broadcast SDT-ConfigCommon via SIB1 reception (e.g., SIB1 may be transmitted via broadcasting approach or UE-specific RRC signaling, such as RRCReconfiguration message). So, in some conditions, the UE may check whether the UE supports one specific target function (e.g., the SDT/CG-SDT/RA-SDT/SRB-SDT procedure initiation) (only) while/after the UE has identified that the target functionality is supported by the serving cell. In contrast, the UE may need not to further check whether the UE support the target functionality if the serving cell does not support the target functionality (e.g., SDT-ConfigCommon is absent in the SIB1 transmitted by the serving cell).

In some implementations, the serving RAN may implement connected mode mobility event by transmitting the system information (e.g., MIB/SIB1/SIB2/SIB3/SIB4/SIB5 or other SI) of one or more neighbor cell(s) via UE-specific (RRC) control signaling to the UE. For example, the serving cell (or the serving BS, which is also known as the source cell/source BS in the connected mode mobility event) may transmit the system information blocks (SIBs) of one or more candidate cells/target cells to the UE. Then, after the UE decides to select one of the candidate cells/target cells as the next serving cell of the UE, the UE may refer to/access the SIBs transmitted by the source cell. In some implementations, the next serving cell of the UE may be configured/instructed by the serving RAN (e.g., the source cell/source BS) via UE-specific (RRC) control signaling or broadcasting system information and the UE may refer to/access the SIBs transmitted by the source cell after receiving the instructions to reselect to one of the candidate/target cells as the next serving cell of the UE. In some implementations, the source cell/BS may obtain the system information blocks of neighbor cells via inter-node signaling protocols defined in 3GPP technical specifications.

Figure 7:
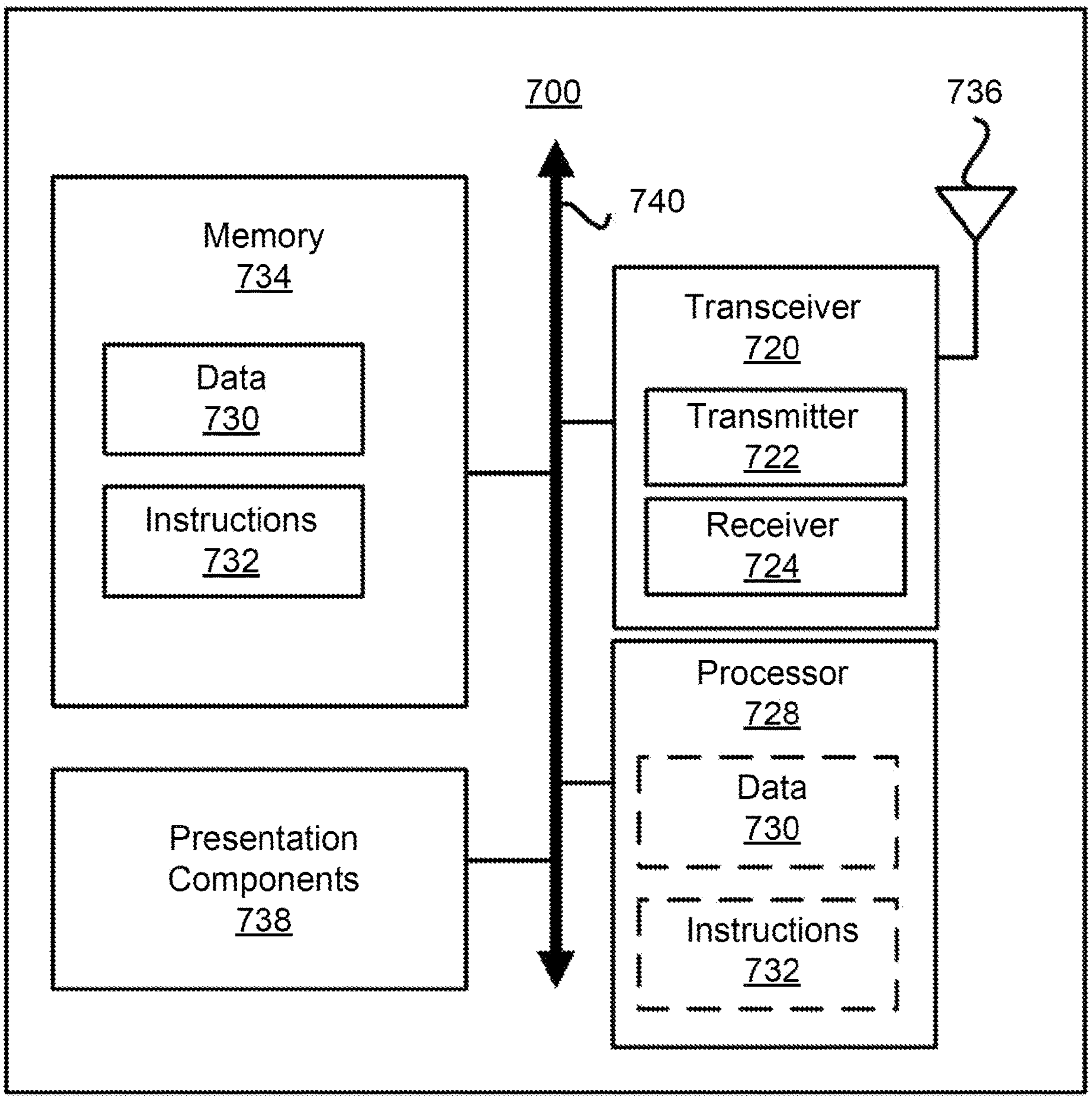
FIG. 7 is a block diagram illustrating a node for wireless communication, according to an example implementation of the present disclosure.

FIG. 7 is a block diagram illustrating a node for wireless communication in accordance with various aspects of the present disclosure. As illustrated in FIG. 7, node 700 may include transceiver 720, processor 728, memory 734, one or more presentation components 738, and at least one antenna 736. Node 700 may also include a radio frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. Node 700 may be a UE or a BS that performs various functions disclosed with reference to FIGS. 1 through 6.

Transceiver 720 has transmitter 722 (e.g., transmitting/transmission circuitry) and receiver 724 (e.g., receiving/reception circuitry) and may be configured to transmit and/or receive time and/or frequency resource partitioning information. Transceiver 720 may be configured to transmit in different types of subframes and slots including, but not limited to, usable, non-usable, and flexibly usable subframes and slot formats. Transceiver 720 may be configured to receive data and control channels.

Node 700 may include a variety of computer-readable media. Computer-readable media may be any available media that may be accessed by node 700 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term “modulated data signal” may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

Memory 734 may include computer-storage media in the form of volatile and/or non-volatile memory. Memory 734 may be removable, non-removable, or a combination thereof. Example memory may include solid-state memory, hard drives, optical-disc drives, etc. As illustrated in FIG. 7, memory 734 may store a computer-readable and/or computer-executable instructions 732 (e.g., software codes) that are configured to, when executed, cause processor 728 to perform various functions disclosed herein, for example, with reference to FIGS. 1 through 6. Alternatively, instructions 732 may not be directly executable by processor 728 but may be configured to cause node 700 (e.g., when compiled and executed) to perform various functions disclosed herein.

Processor 728 (e.g., having processing circuitry) may include an intelligent hardware device, e.g., a Central Processing Unit (CPU), a microcontroller, an ASIC, etc. Processor 728 may include memory. Processor 728 may process data 730 and instructions 732 received from memory 734, and information transmitted and received via transceiver 720, the baseband communications module, and/or the network communications module. Processor 728 may also process information to send to transceiver 720 for transmission via antenna 736 to the network communications module for transmission to a CN.

One or more presentation components 738 may present data indications to a person or another device. Examples of presentation components 738 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for mobility enhancement, the UE configured with a first Small Data Transmission (SDT) configuration by a first cell, the method comprising:

receiving a Radio Resource Control (RRC) release message comprising a suspend configuration from the first cell;

transitioning to an RRC INACTIVE state in response to receiving the RRC release message;

receiving, in the RRC INACTIVE state, a System Information Block Type 1 (SIB1) comprising a second SDT configuration from a second cell;

camping on the second cell in response to receiving the SIB1 from the second cell; and while the UE is camping on the second cell, refraining from using the first SDT configuration to initiate an SDT procedure associated with the second cell in a case that the UE does not support performing the SDT procedure associated with the second cell.

2. The method of claim 1, wherein the SDT procedure comprises at least one of a Random Access (RA)-based SDT procedure, a Signaling Radio Bearer (SRB)-based SDT procedure, or a Configured Grant (CG)-based SDT procedure.

3. The method of claim 1, wherein the first cell comprises a Terrestrial Network (TN) cell and the second cell comprises a Non-Terrestrial Network (NTN) cell.

4. The method of claim 1, wherein refraining from using the first SDT configuration comprises:

maintaining, but not using, the first SDT configuration while the UE is camping on the second cell.

5. The method of claim 1, wherein refraining from using the first SDT configuration comprises:

releasing the first SDT configuration while the UE is camping on the second cell.

6. The method of claim 1, further comprising:

transitioning to an RRC IDLE state while the UE is camping on the second cell.

7. The method of claim 1, further comprising:

initiating an RRC resume procedure associated with the second cell for uplink packet transmissions or UE capability reporting after camping on the second cell.

8. The method of claim 1, further comprising:

switching to camp on a third cell after camping on the second cell; and initiating the SDT procedure associated with the third cell based on the first SDT configuration in a case that the UE supports performing the SDT procedure associated with the third cell, wherein the third cell is the first cell or a cell other than the first cell.

9. The method of claim 1, further comprising:

while the UE is camping on the second cell, initiating the SDT procedure associated with the second cell based on the first SDT configuration and the second SDT configuration in a case that the UE supports performing the SDT procedure associated with the second cell.

10. The method of claim 1, wherein the first cell and the second cell are identical and are either a Terrestrial Network (TN) cell or a Non-Terrestrial Network (NTN) cell.

11. A User Equipment (UE), configured with a first Small Data Transmission (SDT) configuration by a first cell, the UE comprising:

at least one processor; and at least one memory coupled to the at least one processor, the at least one memory storing one or more computer-executable instructions that, when executed by the at least one processor, cause the UE to:

receive a Radio Resource Control (RRC) release message comprising a suspend configuration from the first cell;

transition to an RRC INACTIVE state in response to receiving the RRC release message;

receive, in the RRC INACTIVE state, a System Information Block Type 1 (SIB1) comprising a second SDT configuration from a second cell;

camp on the second cell in response to receiving the SIB1 from the second cell; and while the UE is camping on the second cell, refrain from using the first SDT configuration to initiate an SDT procedure associated with the second cell in a case that the UE does not support performing the SDT procedure associated with the second cell.

12. The UE of claim 11, wherein the SDT procedure comprises at least one of a Random Access (RA)-based SDT procedure, a Signaling Radio Bearer (SRB)-based SDT procedure, or a Configured Grant (CG)-based SDT procedure.

13. The UE of claim 11, wherein the first cell comprises a Terrestrial Network (TN) cell and the second cell comprises a Non-Terrestrial Network (NTN) cell.

14. The UE of claim 11, wherein refraining from using the first SDT configuration comprises:

maintaining, but not using, the first SDT configuration while the UE is camping on the second cell.

15. The UE of claim 11, wherein refraining from using the first SDT configuration comprises:

releasing the first SDT configuration while the UE is camping on the second cell.

16. The UE of claim 11, wherein the one or more computer-executable instructions, when executed by the at least one processor, further cause the UE to:

transition to an RRC IDLE state while the UE is camping on the second cell.

17. The UE of claim 11, wherein the one or more computer-executable instructions, when executed by the at least one processor, further cause the UE to:

initiate an RRC resume procedure associated with the second cell for uplink packet transmissions or UE capability reporting after camping on the second cell.

18. The UE of claim 11, wherein the one or more computer-executable instructions, when executed by the at least one processor, further cause the UE to:

switch to camp on a third cell after camping on the second cell; and initiate the SDT procedure associated with the third cell based on the first SDT configuration in a case that the UE supports performing the SDT procedure associated with the third cell, wherein the third cell is the first cell or a cell other than the first cell.

19. The UE of claim 11, wherein the one or more computer-executable instructions, when executed by the at least one processor, further cause the UE to:

while the UE is camping on the second cell, initiate the SDT procedure associated with the second cell based on the first SDT configuration and the second SDT configuration in a case that the UE supports performing the SDT procedure associated with the second cell.

20. The UE of claim 11, wherein the first cell and the second cell are identical and are either a Terrestrial Network (TN) cell or a Non-Terrestrial Network (NTN) cell.

* * * * *